United States Patent
Kim et al.

(10) Patent No.: US 8,457,014 B2
(45) Date of Patent: Jun. 4, 2013

(54) METHOD FOR CONFIGURING CONTROL TUNNEL AND DIRECT TUNNEL IN IPV4 NETWORK-BASED IPV6 SERVICE PROVIDING SYSTEM

(75) Inventors: Sun Cheul Kim, Daejeon (KR); Sung Back Hong, Daejeon (KR); Kyeong Ho Lee, Daejeon (KR); Kyung Pyo Jun, Daejeon (KR); Sang Wha Lee, Seoul (KR)

(73) Assignees: Electronics and Telecommunications Research Institute (KR); Mobileconvergence Co., Ltd. (KR)

( * ) Notice: Subject to any disclaimer, the term of this patent is extended or adjusted under 35 U.S.C. 154(b) by 1003 days.

(21) Appl. No.: 12/517,550

(22) PCT Filed: Nov. 30, 2007

(86) PCT No.: PCT/KR2007/006151
§ 371 (c)(1),
(2), (4) Date: Jun. 3, 2009

(87) PCT Pub. No.: WO2008/069504
PCT Pub. Date: Jun. 12, 2008

(65) Prior Publication Data
US 2010/0008260 A1 Jan. 14, 2010

(30) Foreign Application Priority Data

Dec. 4, 2006 (KR) .................. 10-2006-0121831
Aug. 1, 2007 (KR) .................. 10-2007-0077503

(51) Int. Cl.
*H04L 12/28* (2006.01)
(52) U.S. Cl.
USPC ........................................... 370/254
(58) Field of Classification Search
None
See application file for complete search history.

(56) References Cited

U.S. PATENT DOCUMENTS

| 7,031,328 B2 | 4/2006 | Thubert et al. |
| 7,072,339 B2 | 7/2006 | Tsuchiya et al. |

(Continued)

FOREIGN PATENT DOCUMENTS

| EP | 1 699 185 A1 | 6/2005 |
| JP | 2005-102231 | 4/2005 |

(Continued)

OTHER PUBLICATIONS

Windows IPv6 Advanced Networking Pack for Windows XP, IPv6 Magaiine No. 7 Autumn 2003, Dec. 18, 2003. pp. 44-57.

*Primary Examiner* — Otis L Thompson, Jr.
(74) *Attorney, Agent, or Firm* — Blakely, Sokoloff, Taylor & Zafman

(57) ABSTRACT

Provided is a method for configuring a control tunnel and a direct tunnel in an IPv4 network-based IPv6 service providing system. To provide IPv6 service, when a random request terminal receives a tunnel response message from a control server by using service information downloaded from a portal server at the time of initialization, the request terminal configures a control tunnel with the control server, and is registered to the control server. The request terminal transmits and receives a direct tunnel request message and a direct tunnel response message with a counterpart terminal by using its terminal information learned during the control tunnel configuration, i.e., network position information and status information, thereby configuring a direct tunnel. Thus, IPv6 communication is made through IPv4 based IPv6 tunneling, so that IPv6 application services that are not yet widely used can easily come into wide use. Also, only software change of each terminal and a control server is required without changing existing network equipment, so that a cost burden of a service provider can be minimized.

9 Claims, 17 Drawing Sheets

U.S. PATENT DOCUMENTS

| | | | |
|---|---|---|---|
| 7,277,453 B2 * | 10/2007 | Chin et al. | 370/466 |
| 7,483,697 B2 * | 1/2009 | Ohki | 455/432.1 |
| 7,796,594 B2 * | 9/2010 | Melman et al. | 370/389 |
| 7,810,149 B2 * | 10/2010 | Islam et al. | 726/11 |
| 2004/0013130 A1 * | 1/2004 | Blanchet et al. | 370/466 |
| 2004/0088385 A1 * | 5/2004 | Blanchet et al. | 709/220 |
| 2004/0133692 A1 * | 7/2004 | Blanchet et al. | 709/230 |
| 2005/0160183 A1 * | 7/2005 | Valli et al. | 709/245 |
| 2005/0175020 A1 | 8/2005 | Park et al. | |
| 2006/0028285 A1 * | 2/2006 | Jang et al. | 333/1 |
| 2006/0092964 A1 | 5/2006 | Park et al. | |
| 2006/0095585 A1 * | 5/2006 | Meijs et al. | 709/245 |
| 2006/0125383 A1 | 6/2006 | Liu et al. | |
| 2006/0248202 A1 * | 11/2006 | Blanchet et al. | 709/227 |
| 2007/0006295 A1 * | 1/2007 | Haverinen et al. | 726/14 |
| 2007/0050613 A1 * | 3/2007 | Islam et al. | 713/150 |
| 2007/0183363 A1 * | 8/2007 | Liden | 370/331 |
| 2007/0189219 A1 * | 8/2007 | Navali et al. | 370/331 |
| 2008/0071927 A1 | 3/2008 | Lee | |
| 2008/0089251 A1 * | 4/2008 | Gallego et al. | 370/277 |
| 2008/0216167 A1 * | 9/2008 | Imai et al. | 726/12 |
| 2008/0219224 A1 * | 9/2008 | Balaji et al. | 370/338 |
| 2011/0002220 A1 * | 1/2011 | Park et al. | 370/230 |
| 2011/0007744 A1 * | 1/2011 | Melman et al. | 370/392 |
| 2011/0013647 A1 * | 1/2011 | Park et al. | 370/466 |
| 2011/0023105 A1 * | 1/2011 | Islam et al. | 726/11 |

FOREIGN PATENT DOCUMENTS

| | | |
|---|---|---|
| JP | 2005-260715 | 9/2005 |
| JP | 2008-79304 | 4/2008 |
| JP | 2008-543198 | 11/2008 |
| KR | 10-2005-0057886 A | 6/2005 |
| KR | 10-2005-0065131 A | 6/2005 |
| KR | 10-2005-0079420 | 8/2005 |
| KR | 10-2008-0050238 | 6/2008 |
| WO | WO 2009/005212 A1 | 1/2009 |

* cited by examiner

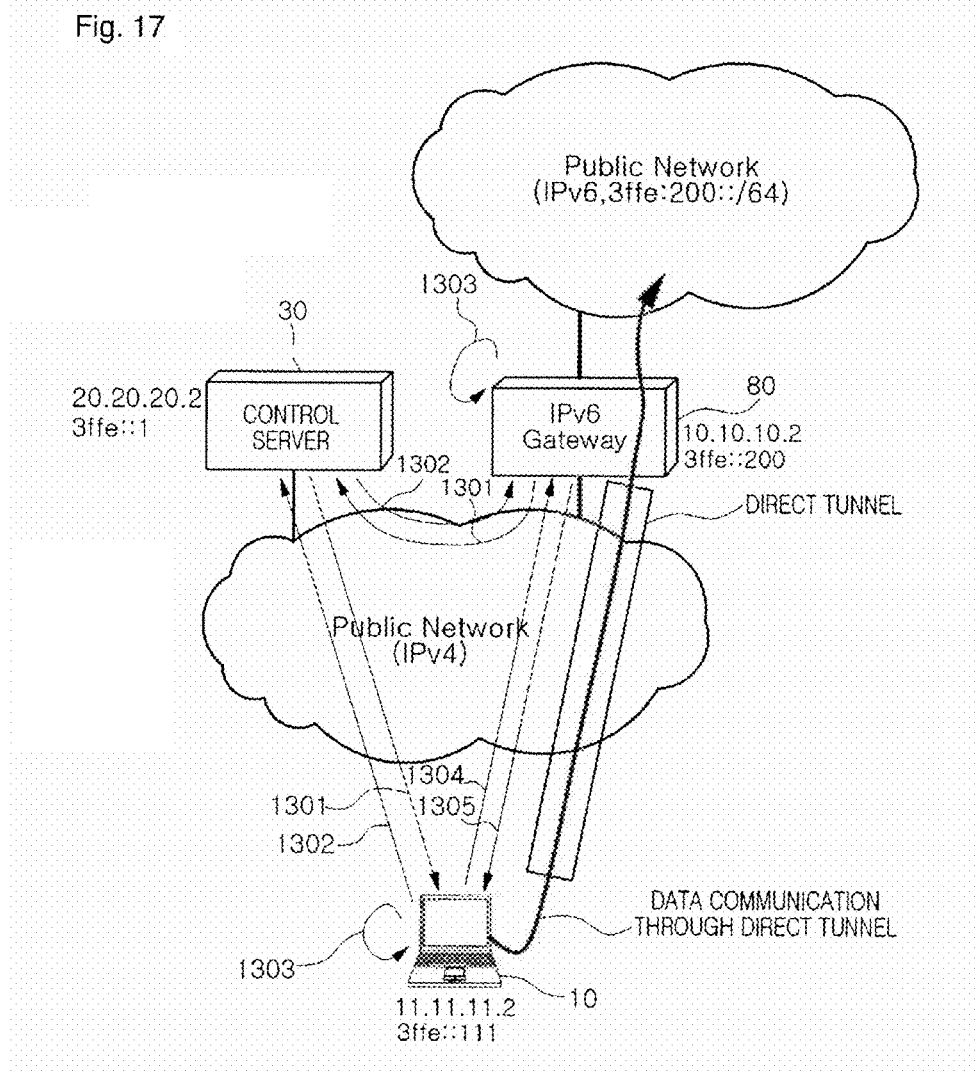

METHOD FOR CONFIGURING CONTROL TUNNEL AND DIRECT TUNNEL IN IPV4 NETWORK-BASED IPV6 SERVICE PROVIDING SYSTEM

This is a non-provisional application claiming the benefit of International application number PCT/KR2007/006151 filed Nov. 30, 2007.

TECHNICAL FIELD

The present disclosure relates to an Internet Protocol version 6 (IPv6) service providing system using a tunneling technology in an IPv4-based network environment, and more particularly, to a method for configuring a control tunnel and a direct tunnel for providing a terminal-to-terminal and terminal-to-network IPv6 communication service.

BACKGROUND ART

In general, a tunneling technology is used to allow an IPv6 packet to cross an IPv4 network by configuring a tunnel, when the IPv6 packet must be transmitted from an IPv6 network to another IPv6 network via the IPv4 network. IPv4/IPv6 dual stack hosts and routers can perform tunneling through an IPv4 routing topology region by encapsulating an IPv6 datagram to an IPv4 packet.

Since IPv6 island networks appear at the beginning stage of IPv4 to IPv6 transition, the tunneling technology will be used to a great extent. Thus, many efforts have been actively made for standardization of the tunneling technologies among various transition technologies. As a result, a variety of tunneling technologies have been proposed as the standard tunneling technology. Representative ones of those tunneling technologies include 'Configured tunnel', '6to4', '6over4' and 'Intra-Site Automatic Tunnel Addressing Protocol (ISATAP)'.

To provide the IPv6 communication between terminals on an IPv4 network, a control tunnel and a direct tunnel are used. The control tunnel is similar to existing Tunnel Broker or Teredo, but includes a user group management module that allows peer-2-peer data communication such as MSN or SkyPe, which is being widely used. The control tunnel provides a direct tunnel between the terminals so that data can be directly transmitted and received therebetween, which is very advantageous in data transmission.

The most important factor in setting the direct tunnel is a network address translator (hereinafter, referred to as an NAT). When terminals are located currently on a network, the terminals may be assigned public IP addresses by an Internet Service Provider (ISP) and may be assigned private IP addresses by the NAT. To overcome the lack of IP addresses, the NAT uses a source NAT (SNAT), dynamic NAT (DNAT)-port forwarding, and a DNAT-load distribution. As for the DNAT-port forwarding, a server to operate is placed on a specific private network, and access thereto is allowed only for a specific user who knows the specific private network on which the service is placed. In the case of the DNAT-load distribution, the load of TCP/UDP traffic is distributed to a plurality of servers on an internal network. Such an NAT is connected to an external network by using a public IP address assigned by the IPS, and assigns a private IP address to each of terminals attached to the NAT. The NAT enables communication by maintaining mapping information of a private IP address/port number, and an IP address/port number of an external network. Here, the DNAT is not used for general network operation because the NAT must be controlled in advance for a specific purpose.

The NAT allows terminal host A and terminal host B on its private network having IP address 192.168.2.0 to be connected simultaneously with an external network by using one public IP address 100.100.100.50 allocated to a user from the IPS. In detail, when an NAP router set to a default gateway of the terminal A and terminal B detects through routing that destinations of IP packets sent from the terminal A and terminal B is on the external network, the NAT router buffers IP addresses and port numbers of the transmitting terminals. Then, the NAT router respectively translates the IP addresses and port numbers to the public IP address 100.100.100.50 and new port numbers of 60000 or greater, and transmits to the IPS. A router of the IPS having received the packets considers those packets to be sent from two different processes of the same terminal 100.100.100.50, and thus can transmit the packets to another Internet network without limitations.

Also, when the packets are transmitted from the ISP, the NAT router searches the mapping table including the port numbers and internal network addresses to detect an IP address and a port number of a destination terminal, and transmits to the corresponding terminal. Thus, a plurality of terminals on the private network can use a public network by sharing one IP address provided by the ISP.

The SNAT is available only when clients on the private network access external servers. In the case where file transfer protocol (FTP) servers are installed in the private network, external terminals send packets by using a public IP address allocated to the NAT and a well-known FTP port number such as 20 and 21 since an IP address of the server on the internal network is unknown to the external terminals. The NAT router having received such a packet may consider the destination IP address and port number of the received packet to be for an FTP server installed in the NAT itself, and thus the received packet cannot be transmitted to another FTP server on the private network.

If an external user has already been informed of a specific FTP server in the private network, the user does not use a well-known FTP port number 21, but serves to send a packet whose destination is port number 3000 that is intentionally allocated to the FTP server of an internal network. In detail, a destination IP address of the packet is a public IP address of the NAT, whereas a destination port number is port number 3000, not the well-known FTP port number.

Accordingly, when receiving the FTP packet with the known port number 3000 that the NAT router knows, the NAT router changes the IP address into an IP address of the FTP server installed on its private network, and also changes the destination port number of the packet into port number 21, and then transmits. In such a manner, the NAT router makes the FTP server on the private network accessible by clients on an external network.

However, other users who are not informed of a specific port number of the specific server cannot use the aforementioned function, and to enable this function, information must be stored in the NAT in advance.

The current communication service is based on IPv4, and many efforts are being made to evolve into an IPv6-based service. However, in actuality, there are not many IPv6-based services, and thus technologies for transition from IPv4 to IPv6 are required. Even though many technologies have been conventionally proposed, those conventional technologies require many changes in equipment on a network.

DISCLOSURE OF INVENTION

Technical Problem

An aspect of the present invention provides a method for configuring a control tunnel and a direct tunnel, which enables an IPv6-based service by changing just software of a control server and each terminal, without changing equipment and technologies used in an existing network.

An aspect of the present invention also provides a method for configuring a control tunnel between a terminal and a control server for IPv6 communication and configuring a direct tunnel directly between terminals, by configuring an IPv6 tunnel in an IPv4 network and configuring an IPv6 route in the configured tunnel.

An aspect of the present invention also provides a method for configuring a direct tunnel between terminals according to network positional relationships between the terminals regardless of a private network or a public network, for efficient terminal-to-terminal IPv6 service, and terminal-to-network communication related to an IPv6 gateway.

Technical Solution

According to an aspect of the present invention, there is provided a method for configuring a control tunnel in an Internet Protocol version 4 (IPv4) network-based Internet Protocol version 6 (IPv6) service providing system having at least two terminals, and a portal server and a control server interworking with the terminals over an IPv4 network, the control tunnel being configured at each of the terminals for a terminal-to-terminal IPv6 communication service, including: configuring a control tunnel with the control server when a tunnel response message is received from the control server by using service information downloaded from the portal server at the time of initialization; sending a registration request message to the control server through the configured control tunnel; and reporting completion of control-tunnel configuration and terminal registration when a registration response message is received from the control server.

According to another aspect of the present invention, there is provided a method for configuring a control tunnel in an Internet Protocol version 4 (IPv4) network-based Internet Protocol version 6 (IPv6) service providing system having at least two terminals, and a portal server and a control server interworking with the terminals over an IPv4 network, the control tunnel being configured at the control server for a terminal-to-terminal IPv6 communication service, including: receiving a tunnel request message from each of the terminals; checking a public IPv4 address set on an IPv4 header of the tunnel request message, and an allocated IPv4 address of each of the terminals included in the tunnel request message; configuring a control tunnel with each of the terminals by using the public IPv4 address and the allocated IPv4 address; and registering each of the terminals when a registration request message is received from each of the terminals through the configured control tunnel.

According to another aspect of the present invention, there is provided a method for configuring a direct tunnel in an Internet Protocol version 4 (IPv4) network-based Internet Protocol version 6 (IPv6) service providing system having at least two terminals, and a control server interworking with the terminals over an IPv4 network, the direct tunnel being configured at a random request terminal for IPv6 communication service with a counterpart terminal, including: configuring a control tunnel with the control server; registering the counterpart terminal and learning a status of the counterpart terminal in real-time; sending a direct tunnel request message to the counterpart terminal by using terminal information obtained through the learning; configuring a direct tunnel with the counterpart terminal when a direct tunnel response message is received from the counterpart terminal; and checking whether IPv6 data transmission is available through the configured direct tunnel.

According to another aspect of the present invention, there is provided a method for configuring a direct tunnel in an Internet Protocol version 4 (IPv4) network-based Internet Protocol version 6 (IPv6) service providing system having at least two terminals and a control server interworking with the terminals through an IPv4 network, the direct tunnel being configured for IPv6 communication service at a random counterpart terminal receiving a direct tunnel request, including: receiving a message for the direct tunnel request from a request terminal; searching terminal information of the request terminal included in the message; checking whether the direct tunnel can be configured with the request terminal by using the searched terminal information; determining a network positional relationship with the request terminal by using the searched terminal information if the direct tunnel can be configured; generating a direct tunnel response message according to the determined network positional relationship, and sending the generated direct tunnel response message to the request terminal; and configuring the direct tunnel according to the determined network positional relationship.

According to another aspect of the present invention, there is provided a method for configuring a control tunnel and a direct tunnel in an Internet Protocol version 4 (IPv4) network-based Internet Protocol version 6 (IPv6) service providing system having at least two terminals, and a portal server, a control server and an IPv6 gateway interworking with the terminal through an IPv4 network, the control tunnel and the direct tunnel being configured at each of the terminals for terminal-to-network IPv6 communication service, including: configuring a control tunnel with the control server when a tunnel response message is received from the control server by using service information downloaded from the portal server at the time of initialization; registering the terminal and the IPv6 gateway to the control server through the configured control tunnel; registering the IPv6 gateway as a counterpart terminal on a counterpart terminal list in the terminal; transmitting a terminal information request message to the IPv6 gateway and receiving a terminal information response message from the IPv6 gateway to check a network address of a network connected to the IPv6 gateway; configuring a direct tunnel to the IPv6 gateway by using the network address; and performing communication with IPv6 terminals on an IPv6 network connected to the IPv6 gateway through the configured direct tunnel.

The details of one or more embodiments are set forth in the accompanying drawings and the description below. Other features will be apparent from the description and drawings, and from the claims.

Advantageous Effects

In providing an IPv6 service, only software of each terminal and a control server needs to be changed without changing existing network equipment. Thus, a cost burden of a service provider is minimized, an existing IPv4 network can be used, and IPv6 communication is performed through IPv4-based IPv6 tunneling, so that IPv6 application services that are not yet widely used can easily come into wide use.

BRIEF DESCRIPTION OF THE DRAWINGS

FIG. 17 shows a network configuration and an operation for end-to-network IPv6 communication according to a third embodiment of the present invention.

BEST MODE FOR CARRYING OUT THE INVENTION

Reference will now be made in detail to the embodiments of the present disclosure, examples of which are illustrated in the accompanying drawings. In some embodiments, well-known functions and structures will not be described in detail to avoid ambiguous interpretation of the present invention.

Embodiments of the present invention propose an IPv4 network-based IPv6 service providing system with a server-client configuration including a control server and terminals in order to minimize changes in network equipment that are caused by the use of an Internet Protocol version 6 (IPv6) service. There will now be described an apparatus and method for configuring a control tunnel and a direct tunnel for IPv6 communication between terminals in the IPv4 network-based IPv6 service providing system.

First, a structure of the IPv4 network-based IPv6 service providing system, and a process in which a terminal subscribes to a service portal server, and downloads service information from the server.

Figure 1:
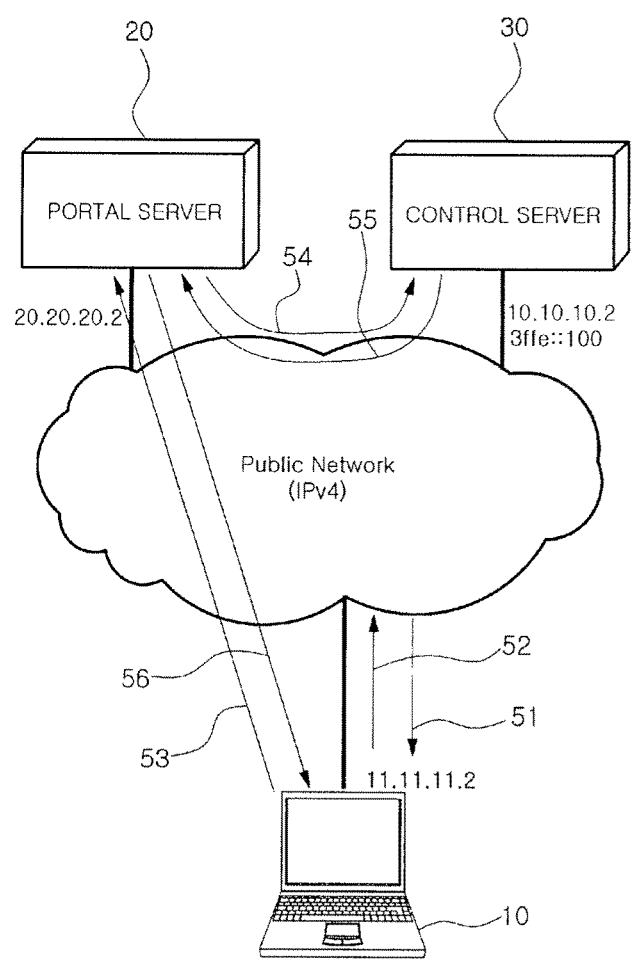
FIG. 1 is a view showing a process of subscribing to a portal server and receiving service information in an IPv4 network-based IPv6 service providing system according to embodiments of the present invention.

Referring to FIG. 1, the IPv4 network-based IPv6 service providing system has a structure where a terminal 10, a portal server 20, and a control server 30 interwork with one another through an IPv4 network or a public network. To implement a peer-to-peer (P2P) IPv6 service, a control tunnel and a direct tunnel are configured. The control server 30 must be on a public network for configuration of a control tunnel with the terminal 10, and the terminal 10 may be on the public network, or on a private network connected to a network address translator (NAT).

The terminal 10 subscribes to the portal server 20 to receive service, and downloads client software and control information. The terminal 10 configures a control tunnel with the control server 30 by using the downloaded software and control information, and performs data communication through the control tunnel. Also, the terminal 10 creates a direct tunnel to a counterpart terminal (not shown) for data transmission. The control tunnel is a tunnel that exists all the time in an online status of the terminal 10, and the direct tunnel is a flexible tunnel that is created and eliminated whenever an application such as voice over internet protocol (VoIP) and file transfer is used and ended.

The control server 30 performs control tunnel configuration and terminal registration under a request of the terminal 10, and also performs forwarding of an IPv6 packet to allow terminal-to-terminal communication through the control tunnel.

In the IPv4 network-based IPv6 service providing system having such a structure, a process in which each terminal, i.e., a subscriber, accesses a portal server to subscribe to service, and obtains service information will now be described.

The service information is an IPv6 address of the terminal 10, a user name, and an IPv4 address and an IPv6 address of the control server 30.

In detail, the IPv6 address of the terminal 10 is an address for IPv6 communication of the terminal 10 subscribed to service. The user name may be a name that a user group management module uses to manage counterpart terminals having registered to the service. The IPv4 address of the control server 30 is used in receiving/transmitting a protocol message when the terminal 10 configures a control tunnel. The IPv6 address of the control server 30 is used to transmit/receive a protocol message when the terminal 10 is registered to the control server 30 after the control tunnel configuration. An IPv4 address of the terminal 10 is not obtained from the portal server 20, but is obtained statically by a user or dynamically by dynamic host configuration protocol (DHCP) on a network on which the terminal 10 is placed.

Referring to FIG. 1, in operations 51 and 52, the terminal 10 obtains an IPv4 address from a DHCP server (not shown). The IPv4 address may be statically assigned by a user.

In operation 53, the terminal 10 sends a subscription request message to the portal server 20 to be registered to service. In operation 54, the portal server 20 informs the control server that the terminal 10 is to use the control server 30.

In operation 55, the control server 30 determines/manages that the terminal 10 is to use the control server 30, and sends a response message to the portal server. In operation 56, the portal server 20 sends the terminal 10 a response message including client software and service information for providing service.

Types of control and direct tunnels in the IPv4 network-based IPv6 service providing system, and a method for configuring the control tunnel and the direction tunnel will now be described with reference to accompanying drawings.

Each of terminals in an IPv4 network configures a control tunnel through transmission and reception of initial IPv4 messages, and is registered to a control server through transmission and reception of IPv6 messages. Thereafter, an IPv6 router is provided to the configured control tunnel, so that IPv6 communication can be made between the terminals. The types of tunnel configured between the control server and the terminal may include an IPv6-user datagram protocol (UDP)-IPv4 type and an IPv6-IPv4 type. The IPv6-UDP-IPv4 type tunnel is configured when the terminal is on a private network. When the terminal is on a public network, both of the IPv6-UDP-IPv4 type tunnel and the IPv6-IPv4 type tunnel are configurable, but mostly, the IPv6-IPv4 type tunnel is configured because of efficiency of data transmission/reception.

To configure a direct tunnel between the terminals, the terminal respectively transmits and receives a direct tunnel request message and a response message by using UDP source port information and a public IPv4 address translated via its NAT learned in the control-tunnel configuration process. The direct tunnel is configured differently in four different cases. There are two types of tunnel configurable according to each case. When the tunnel is configured into the IPv6-UDP-IPv4 type regardless of whether the tunnel is the control tunnel or the direct tunnel, a terminal on the private network periodically sends a Keep-Alive message to renew a lifetime of a mapping table stored in the NAT. The terminal having requested the configuration of the direct tunnel enables an IPv6 P2P service in due consideration of "a function of obtaining network position information of a counterpart terminal", "a function of managing an online/offline status of the counterpart terminal in real time", and "a function of checking possibility of configuring a direct tunnel of a terminal on a private network".

Figure 2:
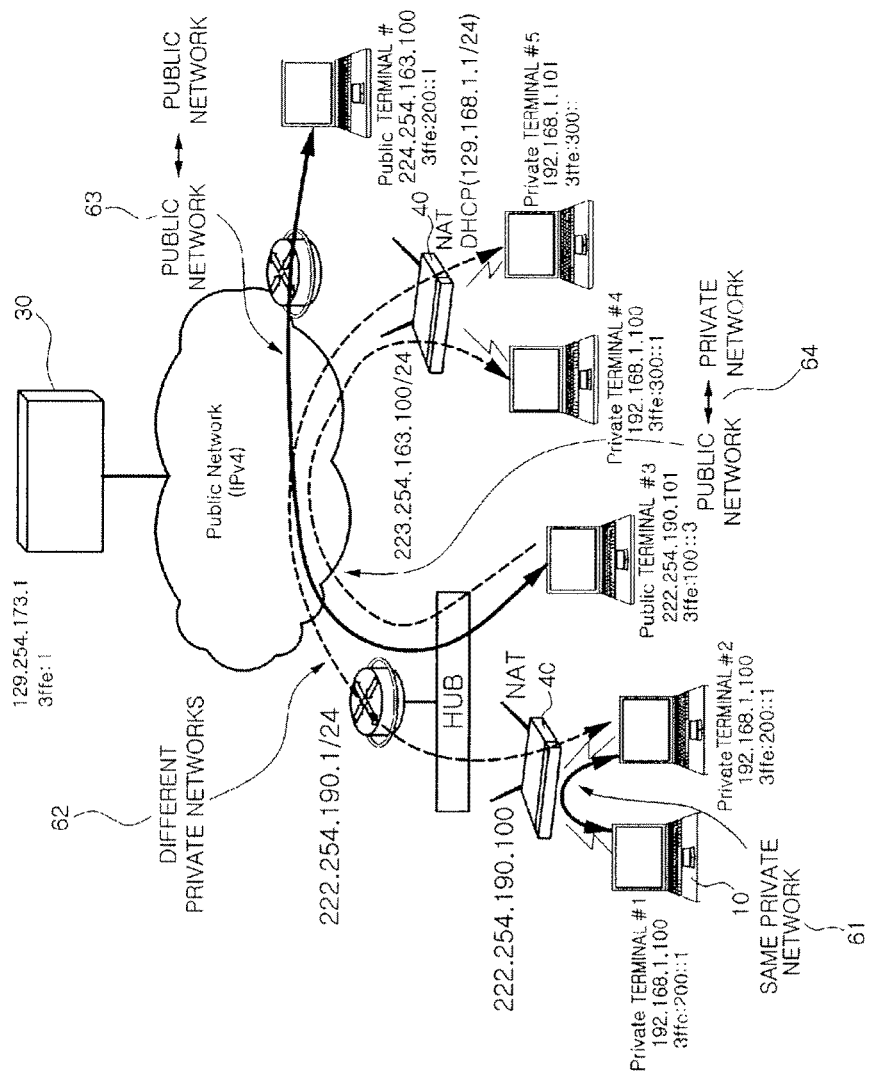
FIG. 2 shows types of control tunnel and direct tunnel configured in an IPv4 network-based IPv6 service providing system according to first and second embodiments of the present invention.

Types of control and direct tunnels configured to provide the IPv6 P2P service according to a positional relationship between terminals on the same network or on different networks will now be described with reference to FIG. 2. There are four different network positional relationships between terminals depending on the position of each terminal.

The first relationship is a relationship on the same private network 61, that is, a relationship between two terminals 10 attached to the same NAT 40. In this case, a configurable direct tunnel type is an IPv6-IPv4 type and an IPv6-UDP-IPv4 type. However, since the IPv6-UDP-IPv4 unnecessarily uses a UDP header, efficiency of packet transfer can be deteriorated. Thus, the IPv6-IPv4 tunnel is used.

The second relationship is a relationship between different private networks 62, that is, a relationship between two terminals 10 attached to their respective NATs 40 on the different private networks. In this case, a configurable direct tunnel type is just an IPv6-UDP-IPv4 type, and thus each terminal 10 must periodically send a NAT Keep Alive message using a set UDP port number to update a table in the NAT 40.

The third relationship is a relationship on a public network, that is, a relationship between terminals on the public network. In this case, a configurable direct tunnel type is an IPv6-IPv4 type and an IPv6-UDP-IPv4 type. However, since the IPv6-UDP-IPv6 type unnecessarily requires a UDP header, efficiency of packet transfer is deteriorated. Accordingly, the IPv6-IPv4 tunnel is used.

The fourth relationship is a positional relationship between a public network and a private network 64, that is, a relationship between one terminal 10 on the public network and another terminal 10 attached to an NAT 40. In this case, a configurable direct tunnel is just an IPv6-UDP-IPv4 type, not an IPv6-IPv4 type. Also, the terminal 10 attached to the NAT 40 must periodically send an NAT Keep Alive message using a UDP port number to update a table in the NAT 40.

Figure 4:
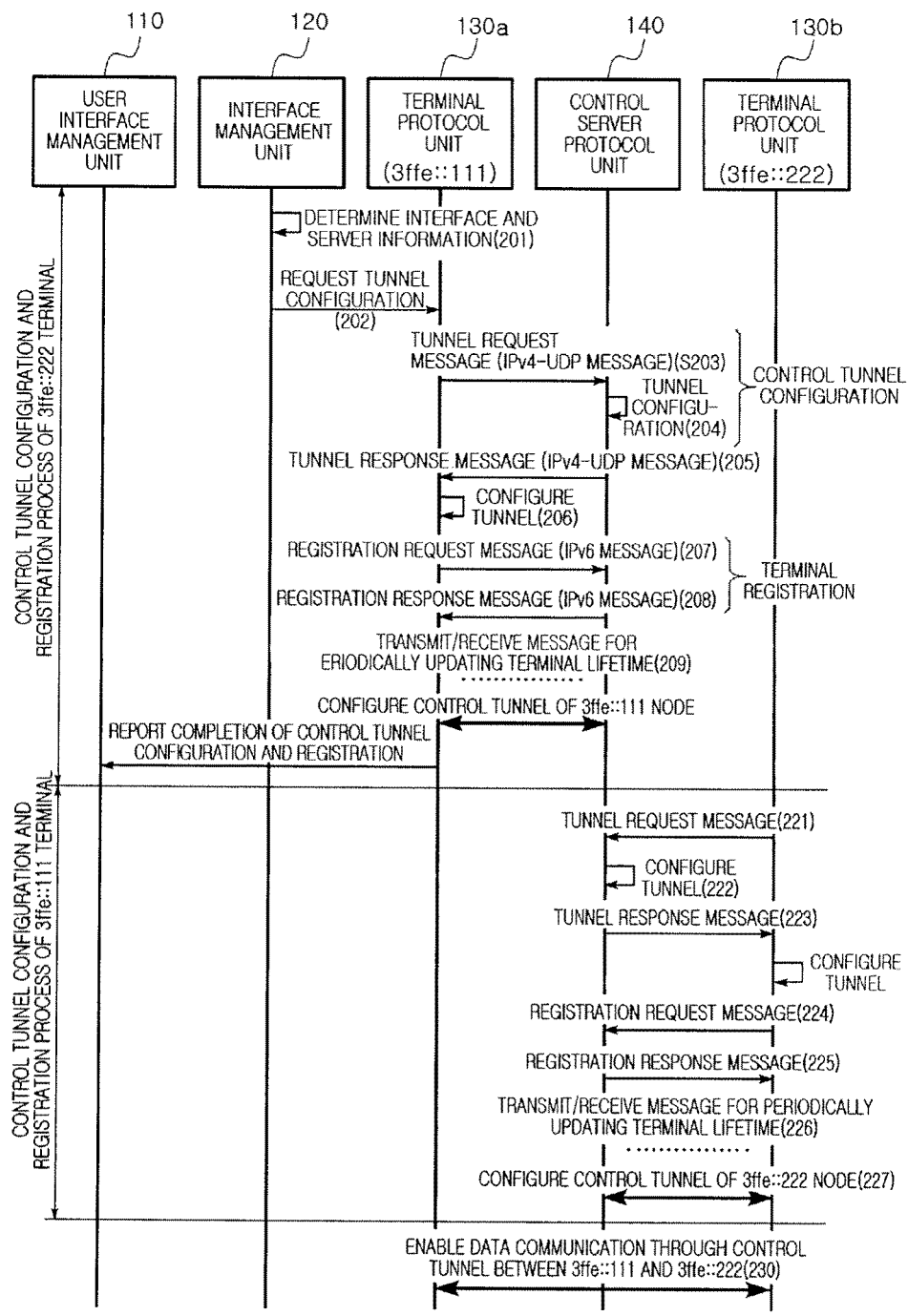
FIG. 4 is a flow diagram showing a process for configuring a control tunnel between a terminal and a server in an IPv4 network-based IPv6 service providing system according to the first embodiment of the present invention.

Referring also to FIG. 4, an apparatus for configuring a control tunnel and a direct tunnel may include a user group management unit 110, an interface management unit 120, a first terminal protocol unit 130a, a second terminal protocol unit 130b, and a control server protocol unit 140.

The user group management unit 110 manages information of each counterpart terminal 10 which an initial terminal 10 wants to communicate with after control tunnel configuration and terminal registration to the control server 30.

The interface management unit 120 is a module that is placed at the terminal 10 and is configured to determine interface information. The interface management unit 120 checks interface information of the terminal 10 that is usable at the time of initial execution, such as an allocated IPv4 address, an IPv6 address, and a terminal name, and manages information for communication with the control server 30 such as an IPv4 address and an IPv6 address. Also, the interface management unit 120 provides the information to the terminal protocol units 130a and 130b.

The first and second terminal protocol units 130a and 130b are placed at respective terminals 10. The first and second terminal protocol units 130a and 130b perform control tunnel configuration and terminal registration through transmission and reception of protocol messages with the control server protocol unit 140. Also, the first and second terminal protocol units 130a and 130b renew a lifetime of a tunnel, and configure a direct tunnel through message transmission and reception with a protocol module of each counterpart terminal.

The control server protocol unit 140 is placed at the control server 30, and performs control operations upon request such as a terminal registration request, a tunnel configuration request, and a lifetime renewing request.

Figure 3:
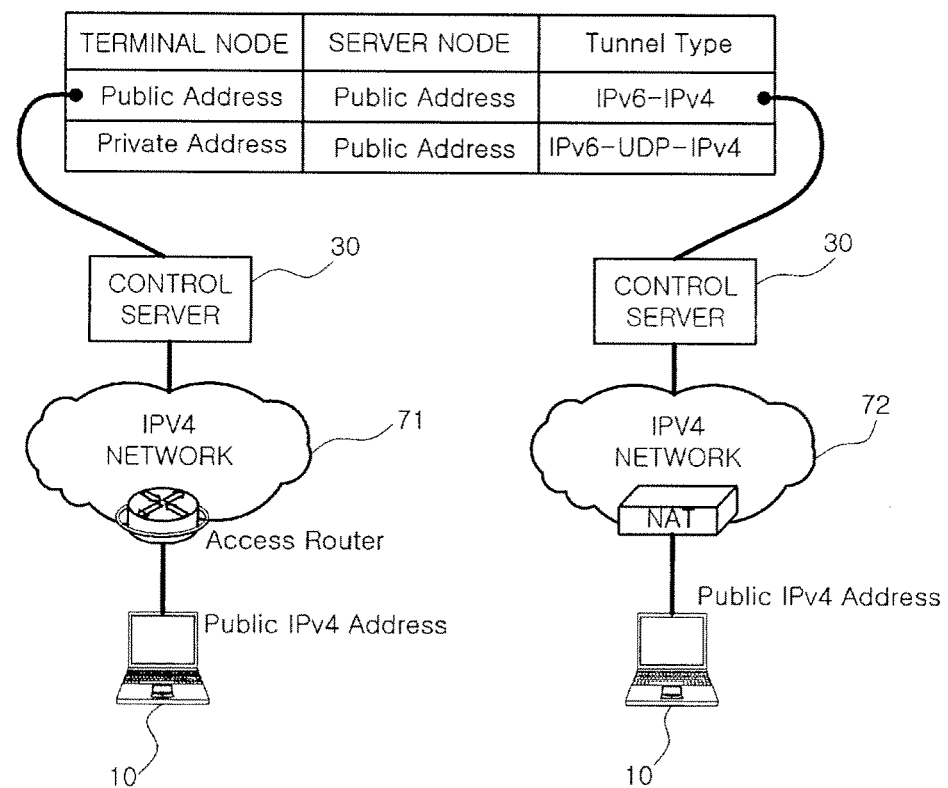
FIG. 3 shows types of tunnel configured when a terminal is initially registered to a control server according to the first embodiment of the present invention.

In FIG. 3, the types of tunnel that the initial terminal configures for registration to the control server 30 according to the positional relations between the terminals are shown.

If the terminal 10 is on a public network 71, an IPv6-IPv4 tunnel is configured and used. If the terminal 10 is on a private network 72, an IPv6-UDP-IPv4 tunnel is configured and used. Here, the terminal 10 on the private network 7 periodically sends an NAT Keep-Alive message to update mapping table of the NAT 40.

A process of initial control-tunnel configuration and terminal registration to a control server depending on a type of a configured terminal will now be described in detail with reference to accompanying drawings.

FIG. 4 is a flow diagram of a process of configuring a control tunnel between a terminal and a server in an IPv4 network-based IPv6 service providing system according to a first embodiment of the present invention.

Referring to FIG. 4, the IPv4 network-based IPv6 service providing system may include a tunnel configuring system including a user terminal group management unit 110, an interface management unit 120, first and second terminal protocol units 130a and 130b, and a control server protocol unit 140 in the control server. The first terminal protocol unit 130a is a protocol unit of a first terminal 3ffe::111, i.e., a request terminal, and the second terminal protocol unit 130b is a protocol unit of a second terminal 3ffe::222, i.e., a counterpart terminal.

Referring to FIG. 4, in operation 201, the interface management unit 120 determines interface information and service information of the request terminal 3ffe::111. In operation 202, the interface management unit 120 sends a tunnel configuration request message for requesting control-tunnel configuration and registration of the request terminal to the first terminal protocol unit 130. In operation 203, the first terminal protocol unit 130a sends a tunnel request message to the control server protocol unit 140 by using information obtained from the tunnel configuration request message sent from the interface management unit 120. In due consideration of the case where the request terminal 3ffe::111 is on a private network of an NAT, the tunnel request message is sent as an IPv4-UDP packet including a specific port number, and includes an IPv4 address, an IPv6 address and other information of the request terminal 3ffe::111.

Then, in operation 204, the control server protocol unit 140 confirms that the request terminal 3ffe::111 is a valid terminal from the information of the received tunnel request message, i.e., an IPv4 UDP message, and then configures a tunnel to the request terminal 3ffe::111. In operation 205, the control server protocol unit 140 sends a tunnel response message to the first terminal protocol unit 130a. Here, the control server protocol unit 140 checks an IPv4 address of the request terminal 3ffe::111 on an IPv4 header of the received tunnel request message, i.e., an public IPv4 address of the request terminal 3ffe::111, and an IPv4 address included in the message, i.e., an allocated IPv4 address of the request terminal 3ffe::111. If the public IPv4 address and the allocated IPv4 address are different from each other, the control server protocol unit 10 determines that the request terminal 3ffe::111 is on a private network using an NAT. Here, the tunnel response message may include information indicating that the terminal 3ffe::111 is attached to the NAT, and also includes the allocated IPv4 address, the IPv4 public address, and a translated UDP port number of the request terminal 3ffe::111. From the above information the control server protocol unit 140 can determine whether the request terminal 3ffe::111 is on a private network using the NAT or on a public network, and thus can determine a type of tunnel to be configured.

In operation 206, the first terminal protocol unit 130a receives the tunnel response message, confirms that the received tunnel response message is a response to the tunnel configuration request message that it sent in operation 202, and then configures a tunnel to the control server. Here, when the request terminal 3ffe::111 is attached to the NAT, the first terminal protocol unit 130a configures the tunnel into an IPv6-UDP-IPv4 type, whereas when the request terminal 3ffe::111 is on the public network, the first terminal protocol unit 130a configures the tunnel into an IPv6-IPv4 type. In the case where the tunnel is the IPv6-UDP-IPv4 type tunnel going by way of the NAT, the first terminal protocol unit 130a periodically sends an NAT Keep-Alive message to update a mapping table of NAT equipment.

After the control tunnel is configured in such manner, in operation 207, the first terminal protocol unit 130a sends a registration request message for registering of the request terminal 3ffe::111 to the control server protocol unit 140. Then, in operation 208, the first terminal protocol unit 130a receives a registration response message through the configured control tunnel. Both of the registration request message and the registration response message must be IPv6 messages.

In operation 209, the first terminal protocol unit 130a transmits/receives messages for confirming that IPv6 data can be transmitted/received through the IPv6-(UDP)-IPv4 tunnel, and for renewing a lifetime of the configured tunnel. In operation 210, the configuration of the control tunnel and the following registration of the request terminal 3ffe::111 are completed. In operation 211, the first terminal protocol unit 130a informs the user group management unit 100 that an initialization process is completed.

When informed that the control-tunnel configuration and the terminal registration are completed from the first terminal protocol unit 130a, the user group management unit 110 adds information of each counterpart terminal 110 in the case where there is user group information of a existing counterpart terminal or a new counterpart terminal is registered. Accordingly, the first terminal protocol unit 110 can manage an online/offline status of each counterpart terminal. Thus, the user management unit 110 can obtain status information of a plurality of counterpart terminals, which is learned from the first terminal protocol unit 130a, and links the obtained status information to an application program, thereby enabling IPv6 data communication.

Each terminal performs the above-described process at an initial stage, so that a control tunnel to a control server can be configured, and the terminal can be registered to the control server. Thus, in operations 211 through 227, the second terminal protocol unit 130b performs the same processes as those in operations 203 through 211 together with the control server protocol unit 140, so that a control tunnel of the counterpart terminal 3ffe::222 can be configured to the control server, and the counterpart terminal 3ffe::222 can be registered to the control server. Thus, in operation 230, IPv6 communication between the registered request terminal and the registered counterpart terminal is enabled through the control tunnel.

Figure 5:
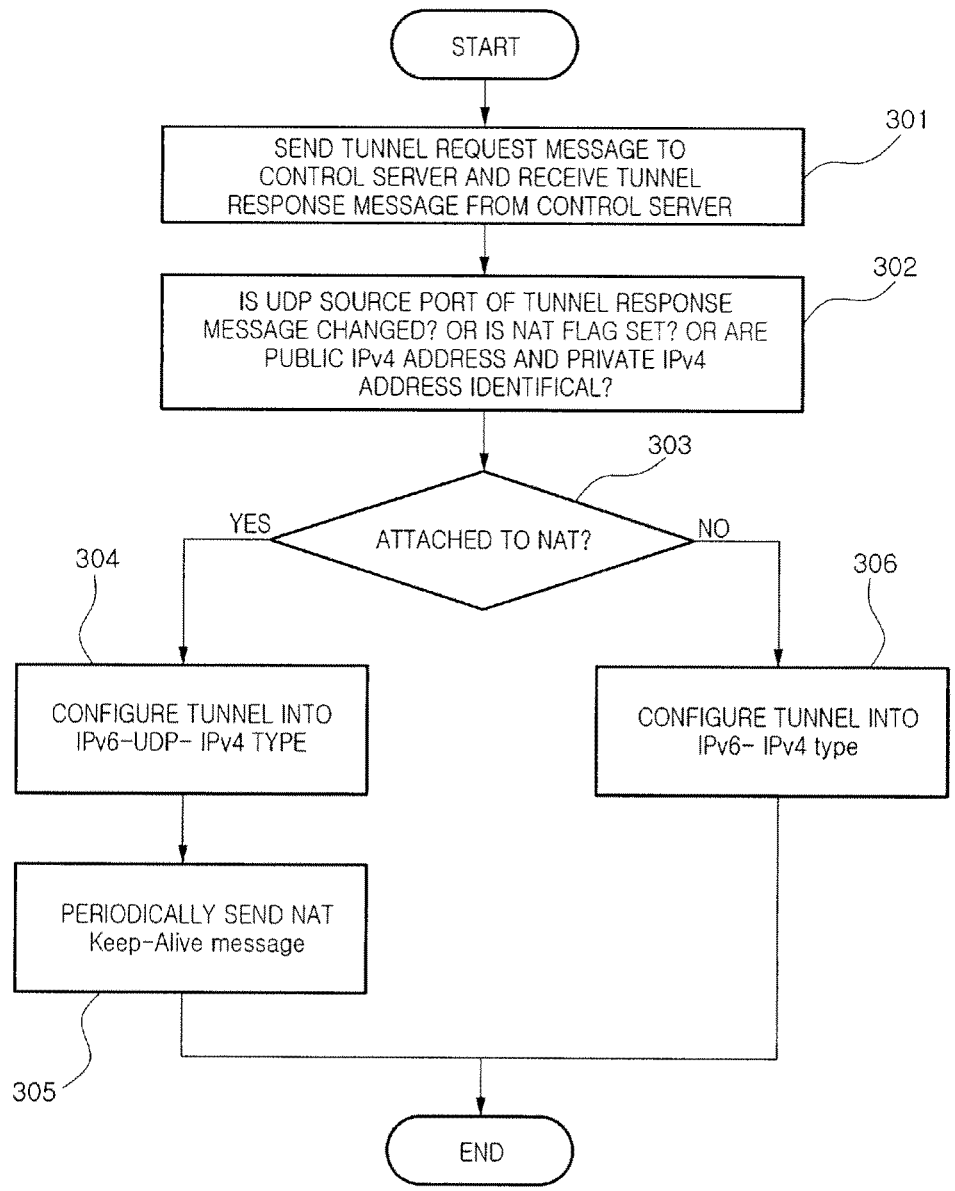
FIG. 5 is a flowchart showing an operation of a terminal protocol unit for configuring a control tunnel in the process of FIG. 4.

An operation of the terminal protocol unit 130 in each terminal for configuring a control tunnel in a control tunnel configuring process will now be described in more detail with reference to FIG. 5.

In operation 301, the terminal protocol unit 130 sends a tunnel request message to a control server, and receives a corresponding tunnel response message from the control server. In operation 302, the terminal protocol unit 130 extracts information included in the tunnel response message in order to determine whether a terminal is on a private network or on a public network, and checks using the extracted information whether an NAT flag is set, whether a public IPv4 address and an allocated IPv4 address are the same, or whether a UDP source port number is changed. The allocated IPv4 address is an IPv4 address assigned to the terminal, and the public IPv4 address is a source address in an IP header that the NAT changes as it passes through the NAT, i.e., an interface IPv4 address of NAT equipment connected to a public network. The changed UDP port number is a source port number changed as a UDP source port number in the tunnel request message passes through the NAT.

In operation 303, the terminal protocol unit 130 determines whether the terminal is attached to the NAT. In operation 304, when it is determined that the terminal is attached to the NAT, i.e., is on a private network, the terminal protocol unit 130 configures an IPv6-UDP-IPv4 tunnel. In operation 305, the terminal protocol unit 130 periodically sends an NAT Keep-Alive message, and then completes the operation. In contrast, in operation 306, when it is determined that the terminal is on a public network, the terminal protocol unit 130 configures an IPv6-IPv4 tunnel for data efficiency, and then completes the operation.

Figure 6:
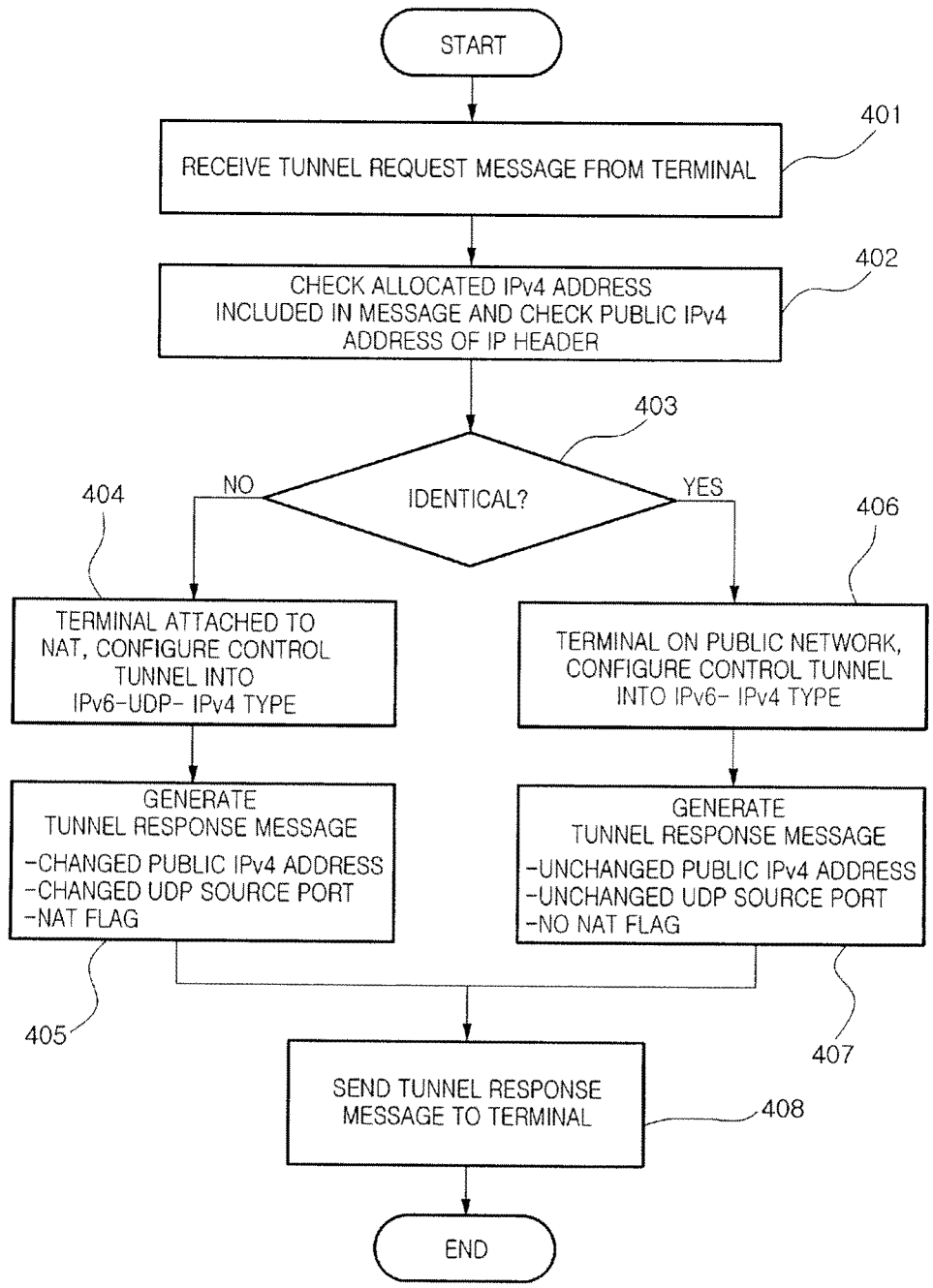
FIG. 6 is a flowchart showing an operation of a terminal protocol unit for configuring a control tunnel in the process of FIG. 4.

An operation of the control server protocol unit 140 for configuring a control tunnel with each terminal will now be described in more detail with reference to FIG. 6.

In operation 401, the control server protocol unit 140 receives a tunnel request message from the terminal protocol unit 130. In operation 402, the control server protocol unit 140 extracts an IPv4 address of the terminal included in an IPv4 header of the received message, i.e., a public IPv4 address of an NAT in the case where the message passes through the NAT, and also extracts an IPv4 address included in the message, i.e., an allocated IPv4 address of the terminal. In operation 430, the control server protocol unit 140 determines whether the two extracted addresses are identical or not. In operation 404, when the extracted addresses are different, the control server protocol unit determines that the terminal having sent the tunnel request message is attached to the NAT on a private network, and thus configures an IPv6-UDP-IPv4 control tunnel with the terminal.

In operation 405, after configuring the IPv6-UDP-IPv4, the control server protocol unit 140 generates a tunnel response message including information that the terminal is attached to the NAT. Here, the tunnel response message includes an "NAT Present Flag" indicating that the terminal is on the private network, or an allocated IPv4 address, a public IPv4 address and a changed UDP port number of the corresponding terminal. The allocated IPv4 address is an IPv4 address allocated to the terminal, and the public IPv4 address is a source address in an IP header that the NAT changes as it passes through the NAT, that is, an interface IPv4 address of NAT equipment connected to a public network. The changed UDP port number is a source port number changed as a UDP source port number in the tunnel request message passes through the NAT.

In operation 406, if the allocated IPv4 address and the public IPv4 address are identical, the control server protocol unit 140 determines that the terminal is on a public network, and configures an IPv6-IPv4 control tunnel with the terminal. Here, although the control server protocol unit 140 can configure both an IPv6-UDP-IPv4 control tunnel and an IPv6-IPv4 control tunnel, it configures the IPv6-IPv4 control tunnel in due consideration of data efficiency. In operation 407, the control server protocol unit 140 indicates False in the NAT Present Flag, or includes the identical value of allocated IPv4 address and the public IPv4 address, and the un-changed UDP port number in due consideration of the case where the request terminal 3ffe::111 is on a private network of an NAT.

After performing operation 405 or 407, the control server protocol unit 140 sends the tunnel response message to the corresponding terminal, and completes an operation.

The method for configuring a control tunnel when each application service requires IPv6 communication according to the first embodiment of the present invention has been described. Thereafter, a method for configuring a direct tunnel when each application service requires IPv6 communication according to a second embodiment of the present invention will now be described.

Figure 7:
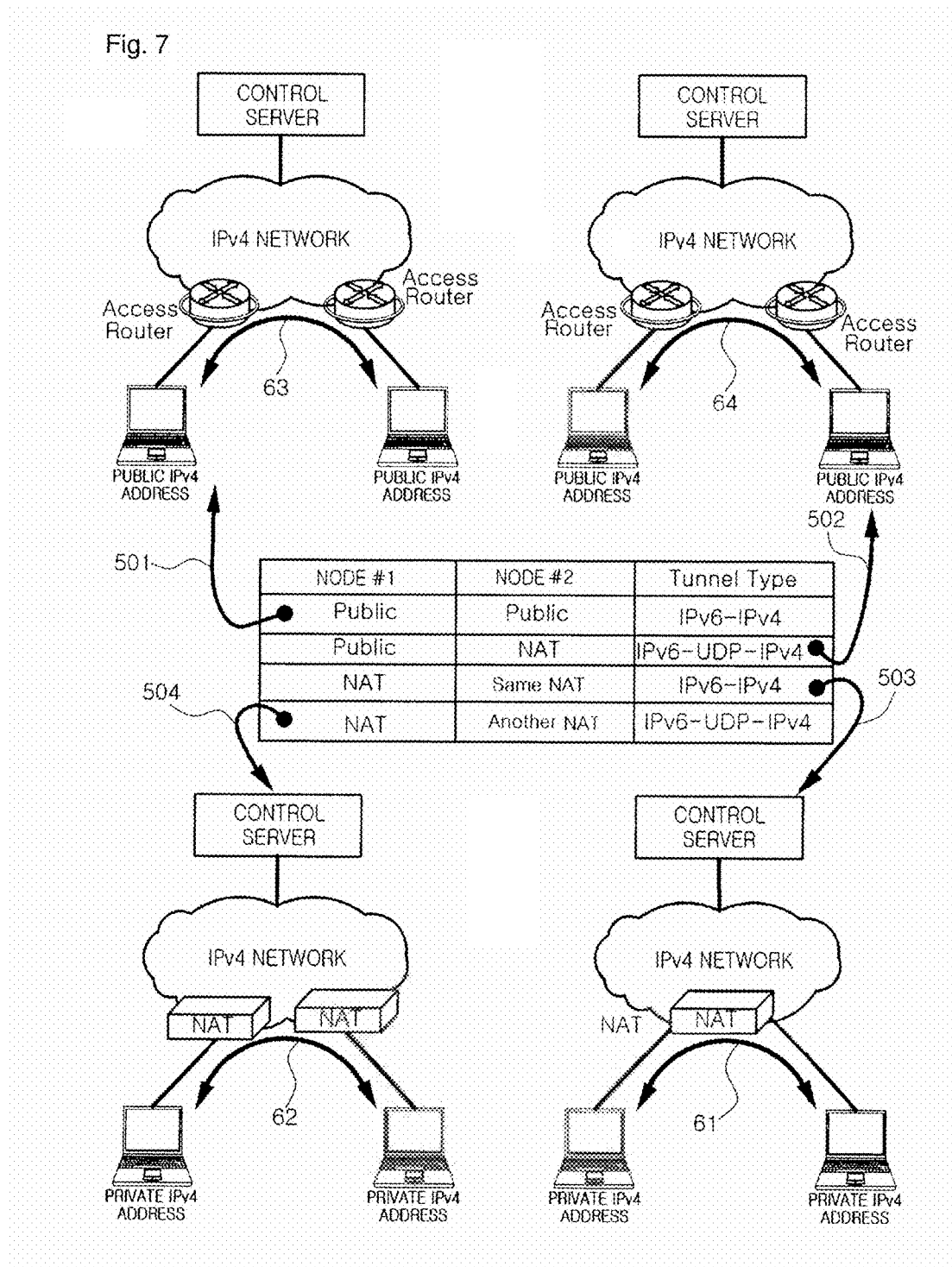
FIG. 7 shows types of tunnel according to a network positional relationship in configuring a direct tunnel in an IPv4 network-based IPv6 service providing system according to the second embodiment of the present invention.

In FIG. 7, configurable tunnel types according to network positional relationships between terminals are shown. As shown in FIG. 2, there are four different network positional relationships between a request terminal and a counterpart terminal for configuring a P2P direct tunnel therebetween.

The first positional relationship is a relationship on a public network 63. In this case, a direct tunnel can be configured into both an IPv6-UDP-IPv type and an IPv6-IPv4 type, but the IPv6-IPv4 tunnel is configured for the data efficiency.

The second positional relationship is a relationship between a public network and a private network 64. In this case, the direct tunnel is configured into an IPv6-UDP-IPv4 type.

The third positional relationship is a relationship on a private network 61, i.e., on the same network. In this case, although the direct tunnel can be configured into both an IPv6-UDP-IPv4 type and an IPv6-IPv4 type, the IPv6-IPv4 tunnel is configured for the data efficiency.

The fourth positional relationship is a relationship between private networks, i.e., different networks. In this case, a configurable P2P direct tunnel type is an IPv6-UDP-IPv4 type.

In the case of the IPv6-UDP-IPv4 tunnel, if the request terminal is placed on the private network, an NAT Keep-Alive message is periodically sent to update a mapping table in NAT equipment. For the two cases in which the IPv6-UDP-IPv4 direct tunnel is configured, changes in a source IP address and a UDP source port number must be considered at the time of tunneling. Here the changes occur since the terminal is attached to the NAT equipment The two cases in which the IPv6-UDP-IPv4 direct tunnel is configured will now be described in detail with reference to FIGS. 8 and 9.

An example of tunnel configuration between a terminal on a public network and a terminal on a private network will now be described.

Figure 8:
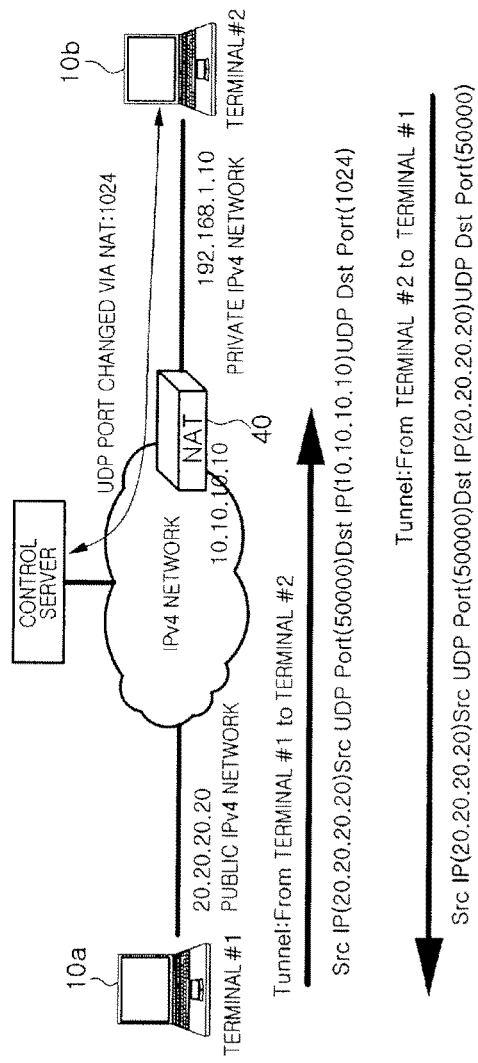
FIG. 8 shows an example of tunnel configuration between a terminal on a public network and a terminal on a private network according to the second embodiment of the present invention.

Referring to FIG. 8, a first terminal 10a is on a public network, and a second terminal 10b is on a private network. In this case, the second terminal 10b learns changed information such as a source IP address and a UDP source port from a control server 30 in an initial tunnel configuration and terminal registration process. Thereafter, like the user registration process described with reference to FIG. 4, the first terminal 10a learns the changed information such as a source IP address and a UDP source port from network position information of the second terminal 10b, and the second terminal 10b learns that the first terminal 10a is on the public network.

Thereafter, when there is a direct tunnel request by a user group management unit or an application of the first terminal 10a or the second terminal 10b, a protocol unit of the first terminal 10a or the second terminal 10b sends a direct tunnel request message to the counterpart terminal, and receives a direct tunnel response message from the counterpart terminal. Thus, the first terminal 10a configures a tunnel as "Src IP(20.20.20.20) Src UDP Port(50000) Dst IP(10.10.10.10) UDP Dst Port(1024)" on the basis of the learned information. Here, it is assumed that the learned information is a UDP source port=50000, and UDP destination Port=50000. Also, "Dst IP(10.10.10.10)" is an IP address changed as it passes through an NAT of the second terminal 10b, and "UDP Dst Port(1024)" is a changed UDP source port number. Also, the second terminal 10b configures a tunnel as "Src IP(192.168.1.10) Src UDP Port(50000) Dst IP(20.20.20.20) UDP Dst Port(50000)" After the tunnel configuration, the two terminals 10a and 10b can freely perform IPv6 communication in an IPv6 NAT environment.

An example of tunnel configuration between terminals on different private networks will now be described.

Figure 9:
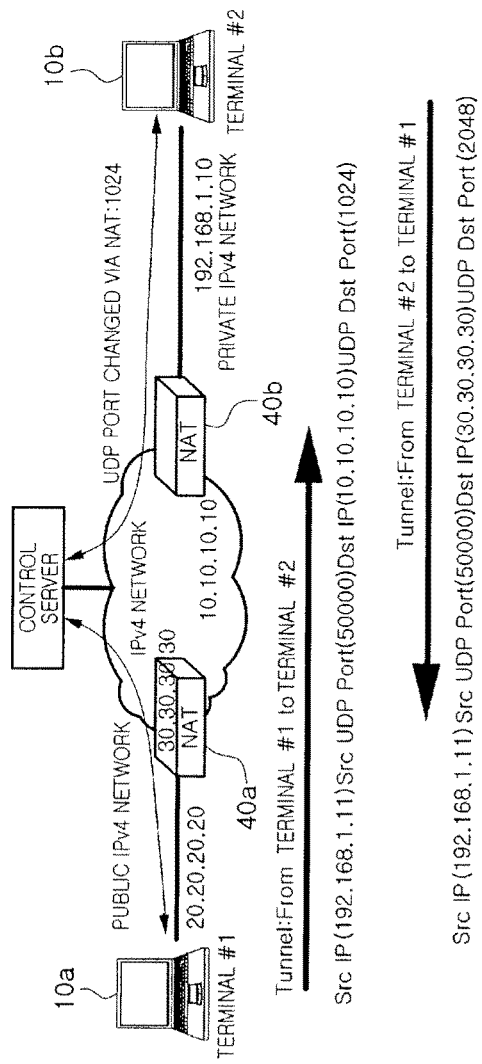
FIG. 9 is an example of tunnel configuration between two terminals in different private networks according the second embodiment of the present invention.

Referring to FIG. 9, a first terminal 10a is on a private network. The first terminal 10a learns that a changed source IP address is 30.30.30.30, and a changed UDP source port number is 2048 from the control server during an initial control-tunnel configuration and terminal registration process. A second terminal 10b is also on a private network, and thus learns that a changed source IP address is 10.10.10.10 and a changed source UDP port number is 1024 during an initial control-tunnel configuration and terminal registration process.

Thereafter, the first terminal 10a learns the changed source IP address and UDP source port number of the second terminal 10b from network position information of the second terminal 10b, and the second terminal 10b learns the changed source IP address and UDP source port number of the first terminal 10a from network position information of the first terminal 10a. Thus, the terminals 10a and 10b learn that they are placed on the different private networks. Each of the terminals 10a and 10b sends a direct tunnel request message and receives a direct tunnel response message with each other to configure a tunnel. Then, the first terminal 10a configures a tunnel as "Src IP(192.168.1.11) Src UDP Port(50000) Dst IP(10.10.10.10) UDPDst Port(1024)" on the basis of the IP address and UDP source port number changed in an NAT 40b to which the second terminal 10b is attached. The second terminal 10b configures a terminal as "Src IP(192.168.1.10) Src UDP Port(50000) Dst IP(30.30.30.30) UDP Dst Port (2048)" on the basis of the IP address and UDP source port number changed in an NAT 40a to which the first terminal 10a is attached. The two terminals 10a and 10b can freely perform IPv6 communication in different NAT environments from each other.

A process for dominantly finding a plurality of counterpart terminals and learning an ON/OFF status thereof by each terminal protocol unit to configure the direct tunnel will now be described in detail with reference to the accompanying drawings.

Figure 10:
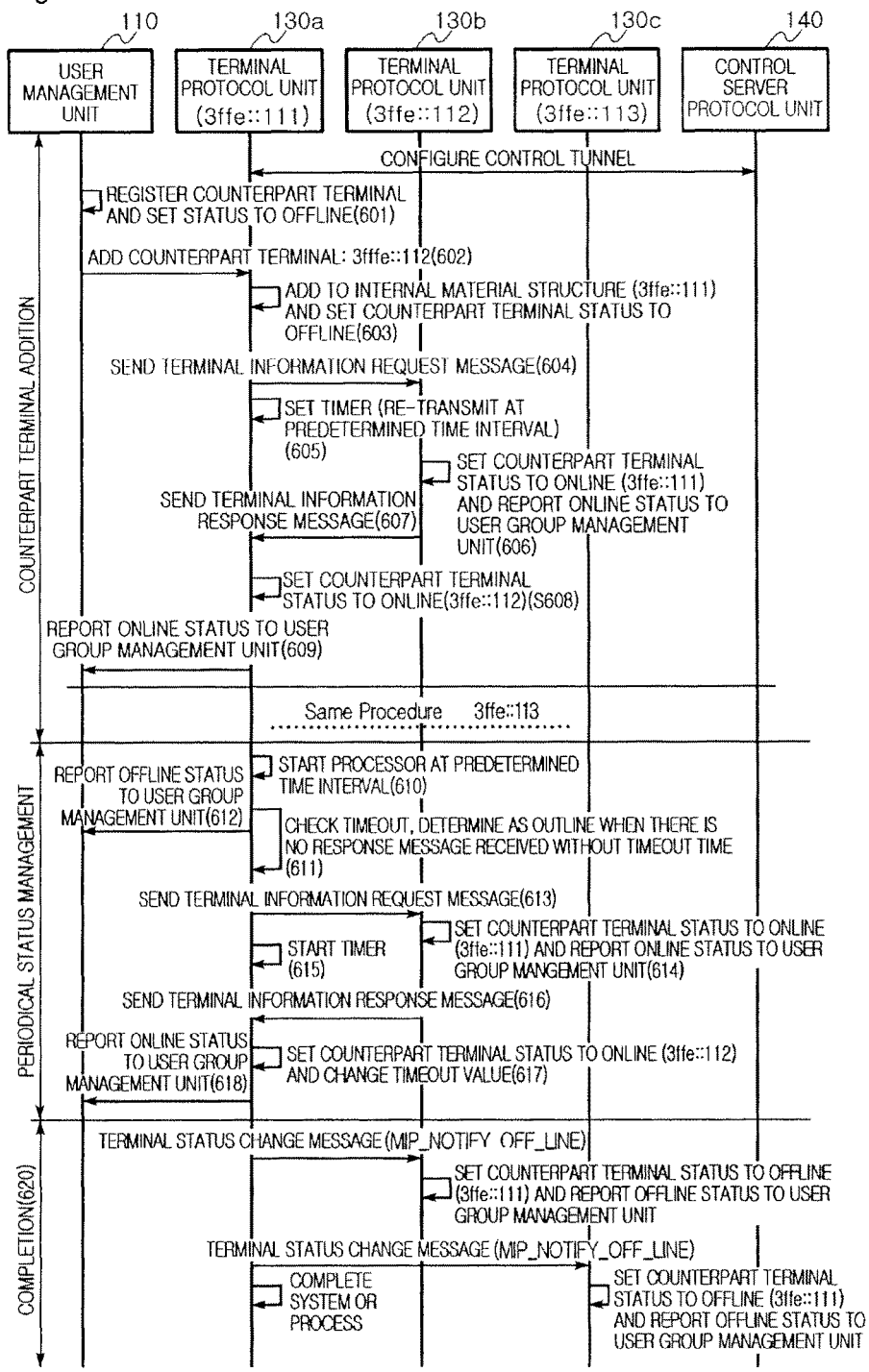
FIG. 10 is a flow diagram showing a process of detecting a plurality of counterpart terminals and learning status information before direct tunnel configuration according to the second embodiment of the present invention.

FIG. 10 is a flow diagram of a process of finding a plurality of counterpart terminals and learning their statuses before configuration of a direct tunnel according to the second embodiment of the present invention.

Referring to FIG. 10, to configure a direct tunnel, the IPv4 network-based IPv6 service providing system according to the second embodiment of the present invention may include a tunnel configuring system including a user group management unit 110, first to third terminal protocol units 130a, 130b and 130c, and a control server protocol unit 140 of a control server. The first terminal protocol unit 130a is a protocol unit of a first terminal 3ffe::111, i.e., a request terminal. The second terminal protocol unit 130b is a protocol unit of a second terminal 3ffe::112, i.e., a counterpart terminal, and the third terminal protocol unit 130c is a protocol unit of a third terminal 3ffe::113, i.e., another counterpart terminal.

The user group management unit 110 is a module that manages a counterpart terminal list for terminal-to-terminal communication. For example, the user group management unit manages (e.g., adds/deletes) list information of counterpart terminals such as a service group or a buddy list of, e.g., Microsoft Network (MSN) or Sky-pe. Also, the user group management unit 110 serves to provide status information such as an online/offline status of a counterpart terminal when each IPv6 application service requires data communication with a counterpart terminal. Also, the user group management unit serves to request configuration/deletion of a tunnel when a tunnel to be used is a direct tunnel.

When the list information of the counterpart terminal is added to a counterpart terminal list of the first terminal protocol unit 130a, the first terminal protocol unit 130a sends/receives a status management message with the second and third protocol units 130b and 130c of the respective second and third terminals 3ffe::112 and 3ffe::113, i.e., the counterpart terminals, so that the status management can be performed in real-time. Also, when the user group management unit 100 or an application requests a direct tunnel with an online counterpart terminal, the first terminal protocol unit 130a sends a direct tunnel request message to a counterpart terminal and receives a direct tunnel response message therefrom to provide the direct tunnel.

This procedure may be divided into a counterpart terminal adding process of registering a counterpart terminal to obtain network position information and an online/offline status of the counterpart terminal in real-time, a status managing process of periodically checking status information in case where real-time transmission/reception of status information to/from the counterpart terminal fails due to a message loss or other reasons, and a completion process of informing a counterpart terminal in the list of an offline status when an abnormal situation occurs.

In operation 600, control-tunnel configuration and terminal registration performed between the terminal protocol unit 130 of each terminal and the control server protocol are previously performed.

In operation 601, the user group management unit 110 registers a counterpart terminal, and sets a status to an offline status. In operation 602, the user group management unit 110 reports information of the counterpart terminal to the first terminal protocol unit 130a. In operation 603, the first terminal protocol unit 130a adds the information of the counterpart terminal to be registered on a list of an internal material structure. In operation 604, the first terminal protocol unit 130a sends a terminal information request message to the second terminal protocol unit 130b in order to check network positional information of the counterpart terminal and an online/offline status thereof. In operation 605, the first terminal protocol unit 130a sets a timer, and resends the terminal information request message at every specific time interval.

In operation 606, the second terminal protocol unit 130b updates network position information of the request terminal 3ffe::111 as soon as the terminal information request message is received, and reports an online status to the user group management unit 110. In operation 607, the second terminal protocol unit 130b sends a terminal information response message including network position information of the counterpart terminal 3ffe::112 to the request terminal 3ffe::111, i.e., the first terminal protocol unit 130a.

In operation 608, when the request terminal 3ffe::111 receives the terminal information request message, the first terminal protocol unit 13a updates the network position information of the counterpart terminal 3ffe::112, and confirms its online status to set the status of the counterpart terminal 3ffe::112 to an online status. In operation 609, the first terminal protocol unit 130a reports the online status to the user group management unit 110. Every message used herein has an IPv6 packet format using a control tunnel. Particularly, if each terminal is on a private network using an NAT, the terminal information request message must include a public IPv4 address and a changed UDP source port number that the request terminal 3ffe::111 has learned during its initial control-tunnel configuration and terminal registration process, and the terminal information response message must include a public IPv4 address and a changed UDP source port number that the response terminal, i.e., the counterpart terminal 3ffe::112 learns during its initial control-tunnel configuration and terminal registration process. The information is needed to pass through the respective NATs when a direct tunnel is configured.

The operations 602 through 609 are performed in the same manner for the third terminal protocol unit, such that a counterpart terminal adding process can be performed.

If the terminal protocol unit 130a cannot determines an abnormal situation occurs in the registration and deletion of a counterpart terminal and step for processing of an abnormal situation occurs, the terminal protocol unit 130a periodically exchange status information with a plurality of counterpart terminals to perform a status management process. The status management process will now be described in detail with reference to FIG. 7.

In operation 610, the first terminal protocol unit 130a starts a processor at a specific time interval. In operation 611, the first terminal protocol unit 130a checks for timeout, and the first terminal protocol unit determines a status of a counterpart terminal as an offline if there is no received response message within the timeout time. In operation 612, the first terminal protocol unit 130a reports the offline status to the user group management unit 110.

In operation 613, the first terminal protocol unit 130a sends a terminal information request message initially sent in counterpart-terminal registration to a plurality of counterpart terminals at a specific time interval. In operation 614, the second terminal protocol unit 130b sets a status of the request terminal 3ffe::111 to an online status.

In operation 615, the first terminal protocol unit 130a starts a timer. In operation 616, the first terminal protocol unit 130a receives a terminal information response message from the second terminal protocol unit 130b. In operation 617, the first terminal protocol unit 130a updates network position information, determines whether the counterpart terminal 3ffe::112 is in an online status to set the status of the counterpart terminal 3ffe::112 to an online status, and changes a timeout value. Here, if the response message is not received during a specific period of time, i.e., until the timer expires, the first terminal protocol unit 130a determines that the counterpart terminal is in an offline status.

In operation 618, the first terminal protocol unit 130a reports the online status to the user group management unit 110.

Also, when an abnormal situation occurs, a process is performed, in which a terminal reports its offline status to counterpart terminals on the list. In detail, when the status of the terminal 3ffe::111 is changed to an offline status due to system or process termination by a user of the terminal, the first terminal protocol unit 130a detects the change in advance, and immediately sends a terminal status change message including NOTIFY_OFF_LINE_STATUS to counterpart terminals 3ffe::112 and 3ffe::113 on the list in operation 620. Then, in operation 620, each of the second and third terminal protocol units 130b and 130c of the respective counterpart terminals 3ffe::112 and 3ffe::113 sets the counterpart node status to an offline status, and reports the offline status to a user group management module, so that each of the corresponding terminals can be immediately informed of the change to the offline status. At this point, the first terminal protocol unit 130a terminates a system or process.

Figure 11:
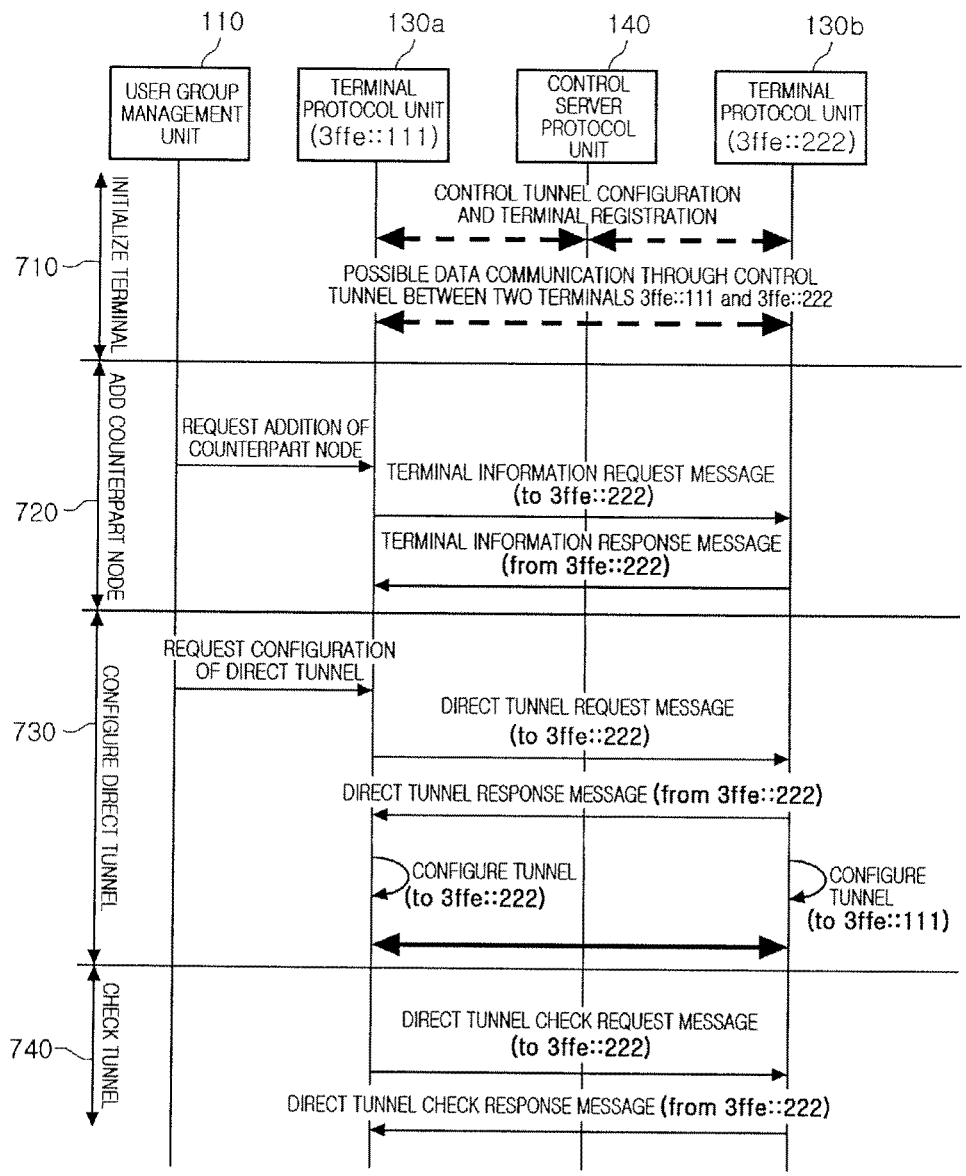
FIG. 11 is a flow diagram showing a process for configuring a direct tunnel between terminals according to the second embodiment of the present invention.

A process for configuring a direct tunnel between terminals according to the second embodiment of the present invention will now be described in detail with reference to FIG. 11.

In operation 710, configuration of a control tunnel between terminals, and terminal registration are performed in advance at the time of terminal initialization. Also, a request terminal 3ffe::111 and a counterpart terminal 3ffe::222 are in a state where data communication therebetween can be made through the control tunnel.

In operation 720, since a user group management unit 110 must be previously informed of network positional information and an online/offline status of a counterpart terminal through registration of a counterpart terminal, the user group management unit 110 sends a counterpart node addition request message to a first terminal protocol unit 130a of the request terminal 3ffe::111. Thus, the first terminal protocol unit 130a sends a terminal information request message to a second protocol unit 130b of the counterpart terminal 3ffe::222, and receives a response message thereto.

In operation 730, the user group management unit 110 or an IPv6 application program makes a direct tunnel request, i.e., a counterpart-node addition request from the first terminal protocol unit 130a. Then, the first terminal protocol unit 130a sends a direct tunnel request message to the second terminal protocol unit 130b. Then, the second terminal protocol unit 130b sends a direct tunnel response message to the first terminal protocol unit 130a, and thereafter configures a direct tunnel. Here, the first terminal protocol unit 130a receives the response message to configure the direct tunnel, so that configuration of the direct tunnel between the two terminals 3ffe::111 and 3ffe::222 is completed. The direct tunnel request message and the direct tunnel response message are transmitted/received through the control tunnel that has been previously configured to ensure data transmission/reception.

In operation 740, in order to check whether IPv6 data transmission is available in the configured tunnel after the direct tunnel is configured, the first terminal protocol unit 130a sends a direct tunnel check request message as an IPv6 packet format to the second terminal protocol unit 130b of the counterpart terminal 3ffe::222, and receives a direct tunnel check response message, thereby confirming the usability of the direct tunnel. If the check messages are not transmitted/received, it means that the configured direct tunnel has a problem. In this case, the two terminals 3ffe::111 and 3ffe::222 respectively eliminate the direct tunnel, and thereafter performs IPv6 communication through the control tunnel.

Figure 12:
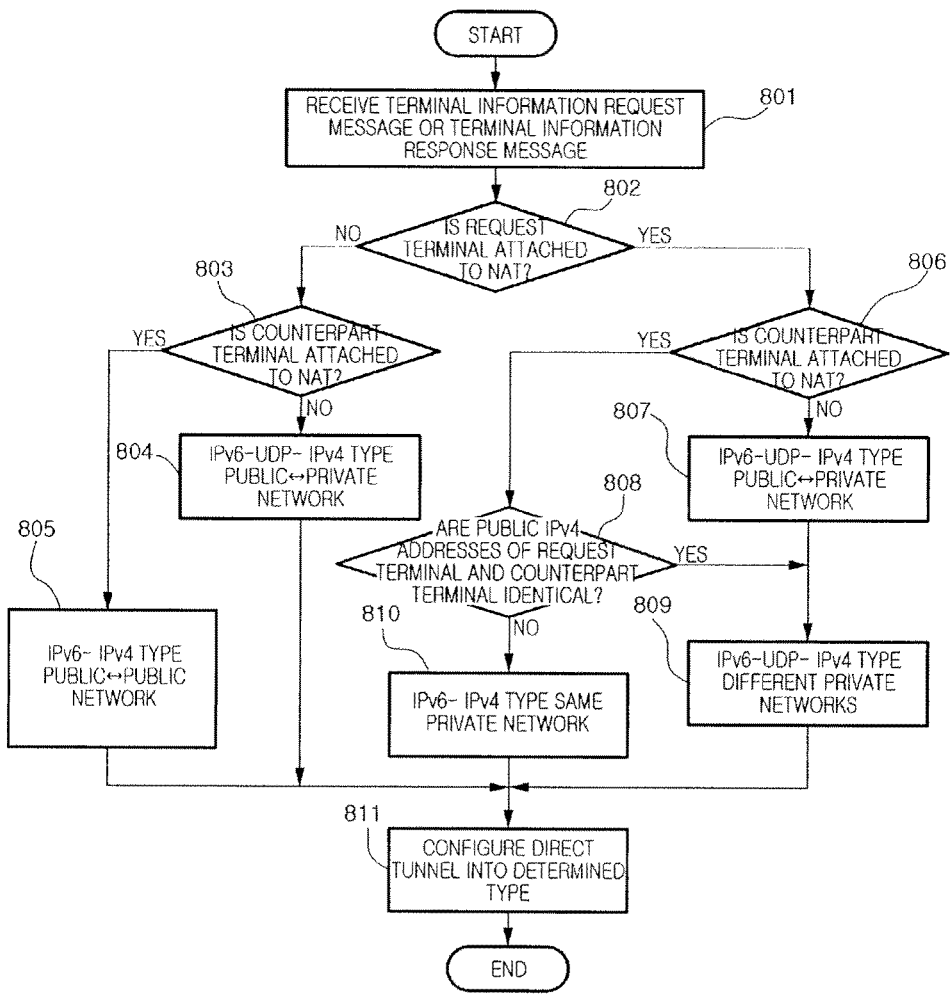
FIG. 12 is a flowchart showing an operation of determining a proper tunnel type by determining a network positional relationship with the counterpart terminal in the process of learning status information and network position information of the counterpart terminal of FIG. 10, and setting a direct tunnel into the determined type.

A process will now be described with reference to FIG. 12, in which a proper type of a direct tunnel is determined on the basis of a determined network positional relationship with a counterpart terminal during the process of learning status information and network position information of the counterpart terminal of FIG. 10.

In operation 801, a request terminal receives a terminal information response message, or a response terminal, i.e., a counterpart terminal receives a terminal information request message. Here, each of the terminals has already learned its network position information during an initial control-tunnel configuration and terminal registration process with respect to the control server. The learned information includes, e.g., a source IP address and a UDP source port number translated as it passes through an NAT, and is included in the corresponding message at the time of message transmission/reception.

In operation 802, when the request terminal receives the corresponding message, it checks whether it is attached to an NAT. In operation 803, if the request terminal is not attached to the NAT, the request terminal checks whether the counterpart terminal is attached to an NAT. In operation 804, if the counterpart terminal is not attached to the NAT, the request terminal determines that a positional relationship with the counterpart terminal is a relationship on a public network 63 of FIG. 7, and thus the request terminal determines a type of a direct tunnel as an IPv6-IPv4 type. Thereafter, operation 811 is performed. In contrast, in operation 805, if the counterpart terminal is attached to the NAT, the request terminal determines that a positional relationship with the counterpart terminal is a relationship between a public network and a private network 64 of FIG. 7, and thus the request terminal determines a type of a direct tunnel as an IPv6-UDP-IPv4 type. Thereafter, the operation 811 is performed.

Also, in operation 806, if the request terminal is not attached to the NAT, the request terminal determines whether the counterpart terminal is attached to an NAT. In operation 807, if the counterpart terminal is not attached to the NAT, the request terminal determines that a positional relationship with the counterpart terminal is a relationship between a public network and a private network 64 of FIG. 7, and thus the request terminal determines a tunnel type as an IPv6-UDP-IPv4 type. In contrast, in operation 808, if the counterpart terminal is attached to the NAT, the request terminal compares its public IPv4 address with its allocated IPv4 address thereof. In operation 809, if the two addresses are identical, the request terminal determines a positional relationship with the counterpart terminal is a relationship on the same private network 61 of FIG. 7, and thus the request terminal determines a tunnel type as an IPv6-IPv4 type. Thereafter, the operation 811 is performed. In contrast, in operation 810, if the two addresses are different, the request terminal determines that a positional relationship with the counterpart terminal is a relationship between different private networks 62 of FIG. 7, and thus determines a tunnel type as an IPvV6-UDP-IPv4 type. Thereafter, in operation 811, the tunnel is configured into the type determined in the aforementioned manner.

Figure 13:
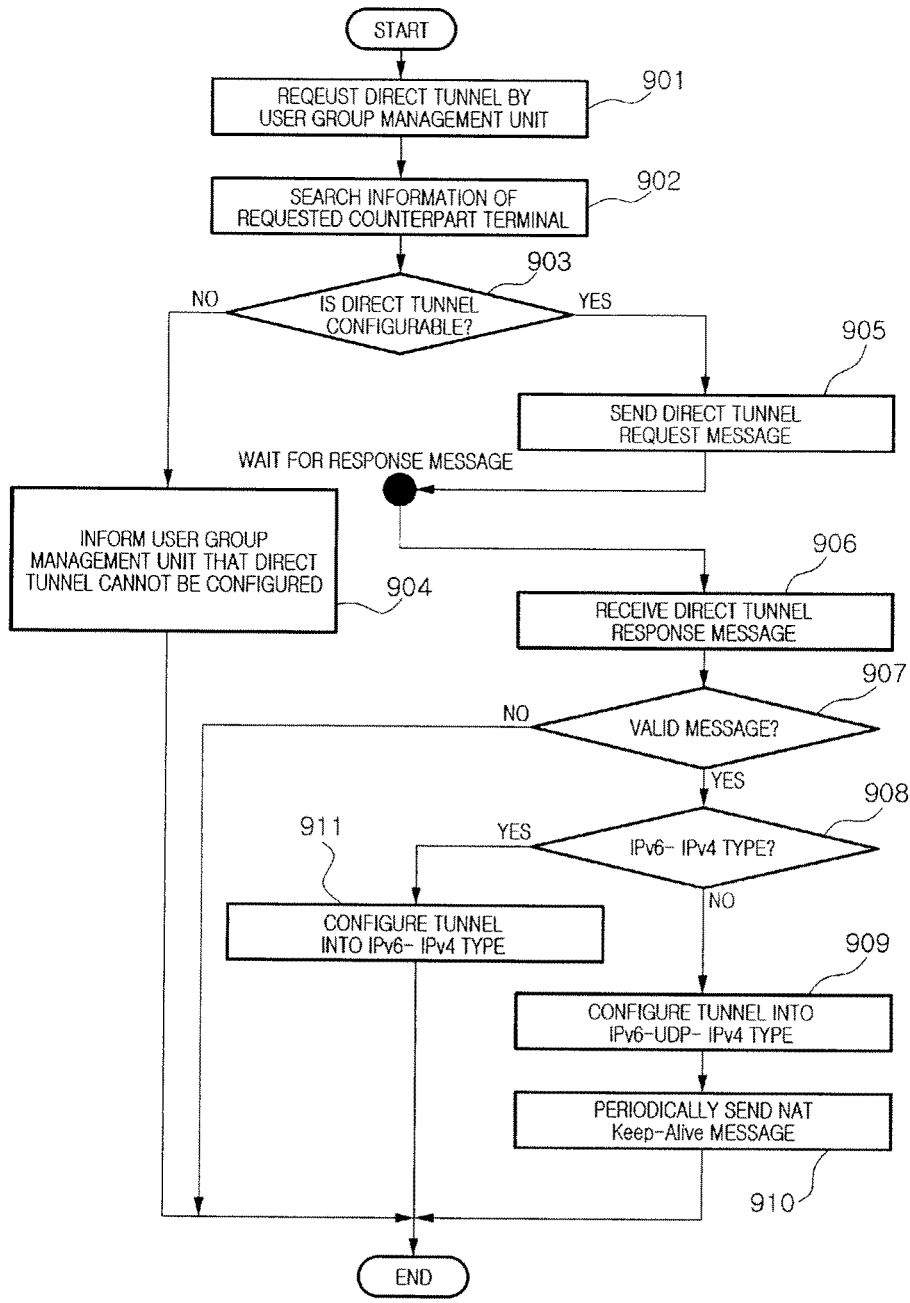
FIG. 13 is a flowchart showing an operation for protocol processing of a request terminal in configuring the direct tunnel of FIG. 11.

An operation of the request terminal that requests a direct tunnel at the time of direct-tunnel configuration shown in FIG. 11 will now be described sequentially with reference to FIG. 13.

In operation 901, the first terminal protocol unit 130 receives a direct tunnel request from the user group management unit 110 or an application. In operation 902, the first terminal protocol unit 130 checks network position information and online status information that has already been obtained during a counterpart terminal registration process.

In operation 903, the first terminal protocol unit 130*a* checks whether the counterpart terminal can configure a direct tunnel. In operation 904, if the counterpart part terminal cannot configure a direct tunnel, the first terminal protocol unit informs the user group management unit 110 or the application that the direct tunnel cannot be configured.

In contrast, in operation 905, if the direct tunnel can be configured, the first terminal protocol unit 130*a* generates a direct tunnel request message, and sends the direct tunnel request message to the counterpart terminal, i.e., the second terminal protocol unit 130*b*. Here, the first terminal protocol unit 130*a* includes network position of the request terminal in the message. In operation 906, the first terminal protocol unit 130*a* receives a direct tunnel response message from the second protocol unit 130*b*. In operation 907, the first terminal protocol unit 130*a* checks whether the received direct tunnel response message is a valid response message from a counterpart terminal list. If the direct tunnel response message is a valid message, the next operation is performed, and if not the message is neglected.

In operation 908, the first terminal protocol unit 130*a* determines a network positional relationship with the counterpart terminal on the basis of the received message, stored network position information of the counterpart terminal, and position information of the request terminal. That is, in operation 908, the first terminal protocol unit 130*a* determines whether a tunnel type is an IPv6-IPv4 type. In operation 909, if the tunnel type is not the IPv6-IPv4 type, the first terminal protocol unit 130 configures a tunnel into an IPv6-UDP-IPv4 type. In operation 910, the first terminal protocol unit 130*a* periodically sends an NAT Keep-Alive message to update a mapping table in NAT equipment. In contrast, in operation 911, if the tunnel type is the IPv6-IPv4 type, the first terminal protocol unit 130*a* configures the tunnel into the IPv6-IPv4 type.

Figure 14:
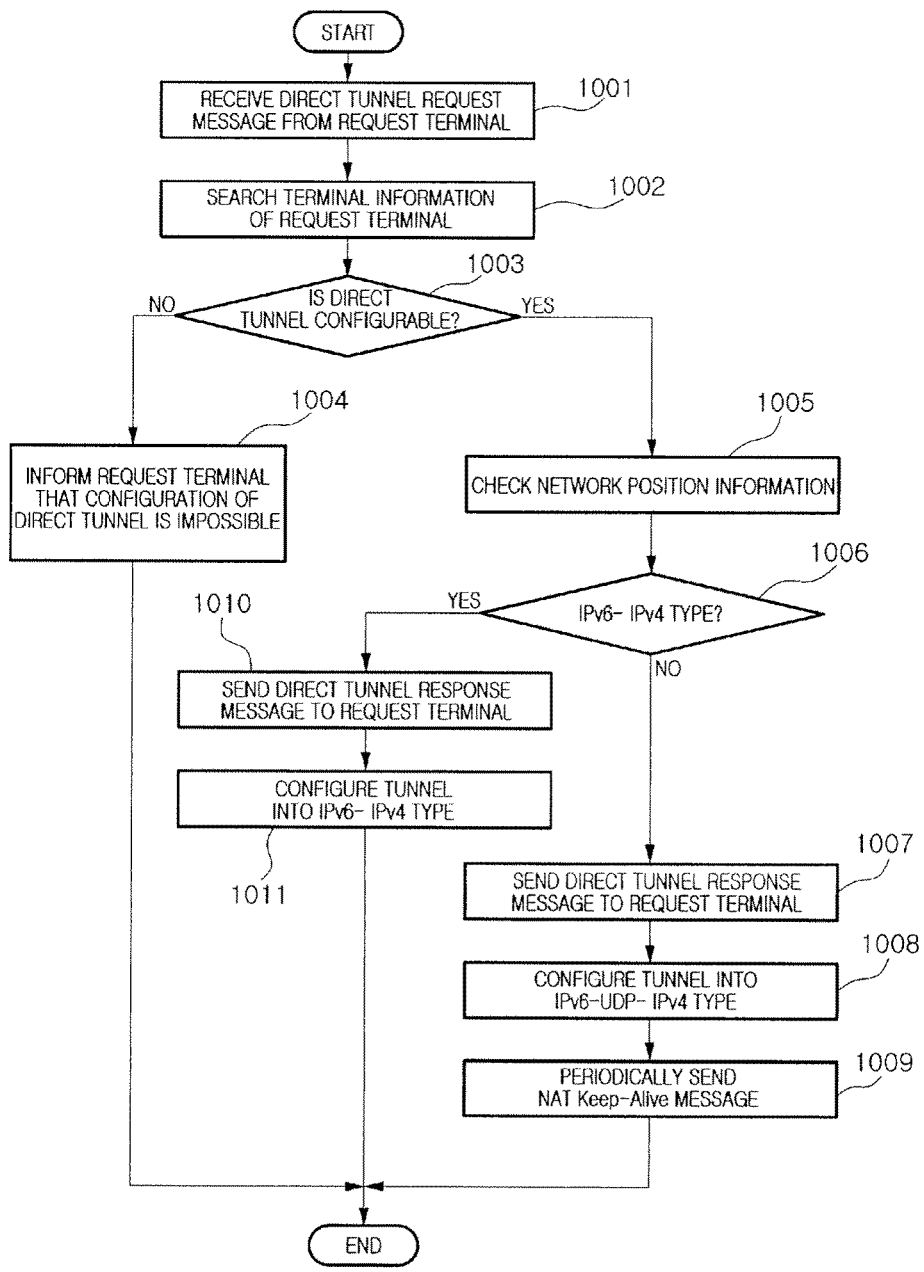
FIG. 14 is a flowchart showing an operation for protocol processing of a response terminal in configuring of the direct tunnel of FIG. 11.

An operation of the counterpart terminal at the time of the direct tunnel configuration process shown in FIG. 11 will now be described in detail with reference to FIG. 14.

In operation 1001, the counterpart terminal, i.e., the second terminal protocol unit 130*b* receives a direct tunnel request message. In operation 1002, the second terminal protocol unit 130*b* searches counterpart node information to check whether the request terminal is a terminal registered by the user group management unit 110.

In operation 1003, the second terminal protocol unit 130*b* checks whether a direct tunnel can be configured. In operation 1004, if the direct tunnel cannot be configured, the second terminal protocol unit 130*b* sends a direct tunnel error message, and informs the request terminal that the direct tunnel cannot be configured.

In contrast, in operation 1005, if the direct tunnel can be configured, the second terminal protocol unit 130*b* checks a network positional relationship between the two terminals on the basis of counterpart terminal information or information of the received message. In operation 1006, the second terminal protocol unit 130*b* checks whether the checked network positional relationship is an IPv6-IPv4 type. In operation 1007, if the network positional relationship is not the IPv6-IPv4 type, the second terminal protocol unit 130*b* sends a direct tunnel response message to the request terminal. In operation 1008, the second terminal protocol unit 130*b* configures a direct tunnel into an IPv6-UDP-IPv4 type. Then, in operation 1009, the second terminal protocol unit 130*b* periodically sends an NAT Keep-Alive message to update a mapping table set in NAT equipment.

In contrast, in operation 1010, if the network positional relationship checked in operation 1006 is the IPv6-IPv4 type, the second terminal protocol unit 130*b* sends a direct tunnel response message to the request terminal. In operation 1011, the second terminal protocol unit 130*b* configures a direct tunnel into an IPv6-IPv4 type.

A process of determining a possibility of configuring/using a direct tunnel according to a network positional relationship of terminals will now be described with reference to FIG. 15.

If a positional relationship between two terminals is a relationship on a public network 63 of FIG. 7, or a relationship on the same private network 61 of FIG. 7, an IPv6-IPv4 tunnel is used so that a direct tunnel can be configured and used all the time. However, if the positional relationship between the two terminals is a relationship between a public network and a private network 64 of FIG. 7, or a relationship on different private networks 62 of FIG. 7, an IPv6-UPD-IPv4 tunnel must be configured and used. In this case, a direct tunnel may not be configured and used depending on a kind of NAT equipment.

The two terminals that cannot use a direct tunnel perform data communication by using a control tunnel. Thus, each terminal learns that NAT equipment of a private network works as a source NAT during a process of configuring a control tunnel and registering a terminal to a control server, if the terminal is on the private network. If the NAT equipment does not act as a source NAT, a request terminal must not request a direct tunnel from a counterpart terminal. If the counterpart terminal requests a direct tunnel from the request terminal, the request terminal informs the counterpart terminal that the direct tunnel cannot be used. In this case, the two terminals that cannot use a direct tunnel use a control tunnel for data communication.

Figure 15:
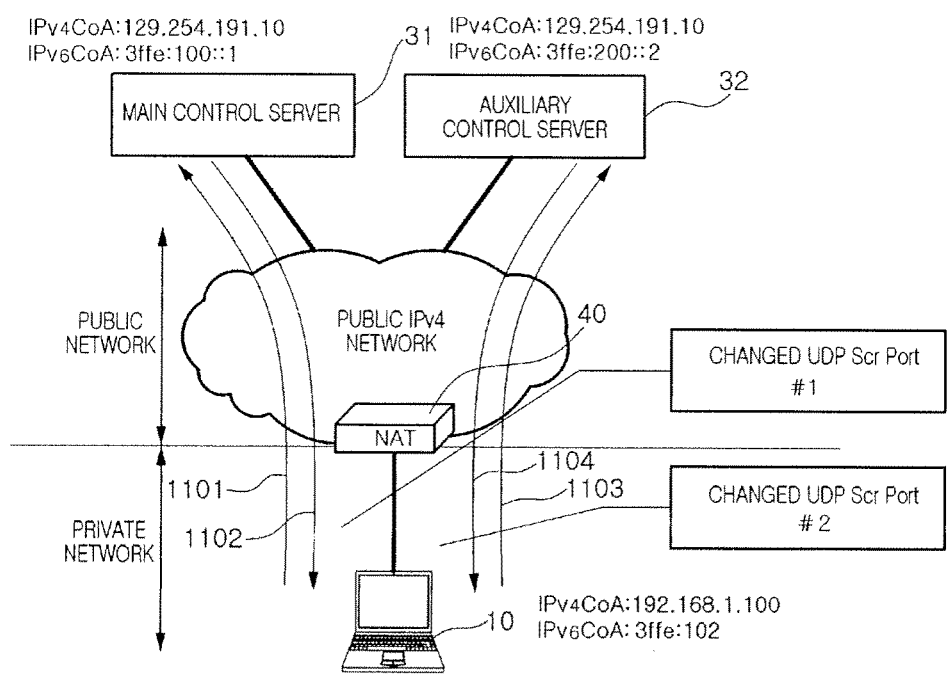
FIG. 15 shows an operation for determining whether a direct tunnel can be configured and used according to the second embodiment of the present invention.

As shown in FIG. 15, a control server according to the second embodiment of the present invention includes a main control server 31 and an auxiliary control server 32 to determine whether the direct tunnel can be configured and used.

The main control server 31 performs configuration of a control tunnel, registration of each terminal 10, and forwarding of an IPv6 packet.

The auxiliary control server 32 receives an NAT check request message that each terminal 10 sends to check whether its NAT equipment acts as a source NAT, and transmits an NAT check response message to each request terminal. Here, the auxiliary control server 32 checks a source port number of a UDP message received from each request terminal, and includes the source port number in the NAT check response message.

Referring to FIG. 15, in the aforementioned process of control tunnel configuration and terminal registration, the terminal 10 sends a tunnel request message in an IPv4 UDP packet to the main control server 13 in operation 1101. Here, the same port is used for a source port and a destination port of a UDP port being used. Thus, in operation 1102, the main control server 31 checks a changed source port number, includes this changed source port number in the tunnel response message, and then sends the message to the terminal 10 via an NAT 40.

In operation 1103, if the terminal 10 is attached to the NAT 40, the terminal 10 sends an NAT check request message to the auxiliary control server 32. A source port number and a destination port number of a UDP port being used must be the same number that was used for the tunnel request message. In operation 1104, the auxiliary control server 32 having received the NAT check request message checks a changed UDP source port number, and sends an NAT check response message including the changed UDP source port number to the terminal 10.

An operation for determining whether the NAT equipment acts as a source NAT in the process of FIG. 15 will now be described with reference to FIG. 16.

Figure 16:
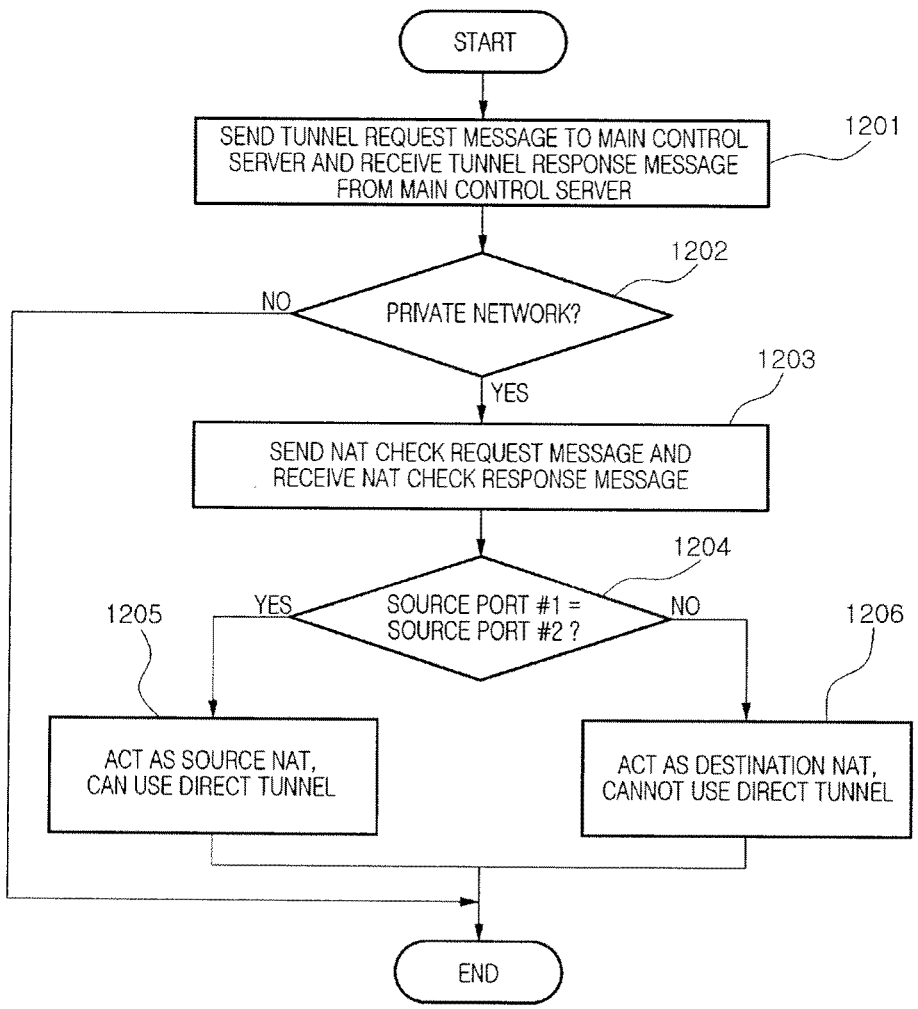
FIG. 16 is a flowchart showing an operation for determining whether the corresponding terminal can use the direct tunnel with the counterpart terminal according to the second embodiment of the present invention.

Referring to FIG. 16, in operation 1201, the terminal 10 sends a tunnel request message in an IPv4 packet to the main control server 31 at the time of initialization, and then receives IPv4 tunnel response message in an IPv4 packet.

In operation 1202, the terminal 10 determines whether it is on a private network or a public network by using information included in the tunnel response message. If the terminal 10 is on the public network, a process shown in FIG. 2 is performed.

However, if the terminal is on the private network, in operation 1203, the terminal sends an NAT checks request message in an IPv4 UDP packet using the same source port to the auxiliary control server 32, and receives an NAT check response message from the auxiliary control server 32. Here, the NAT check request message must include a UDP source port number and a destination port number that are the same as those used in the tunnel request message.

In operation 1204, the terminal compares a changed source port number included in the tunnel response message received from the main control server 31 with a changed source port number in the NAT checks response message received from the auxiliary control server 32.

In operation 1205, if the two changed source port numbers are identical, the terminal determines that the corresponding NAT acts as a source NAT, and thus a direct tunnel can be configured and used. However, in operation 1206, if the two changed source port numbers are not the same, the terminal determines that the corresponding NAT does not act as a source NAT, and thus the direct tunnel cannot be used.

According to above-described embodiments of the present invention, configuration of a control tunnel and a direct tunnel when IPv6 terminal-to-terminal communication is provided. However, according to a third embodiment of the present invention, terminal-to-network communication can be provided. An IPv4 network configuration according to a third embodiment of the present invention will now be described with reference to FIG. 17.

FIG. 17 is a network configuration for terminal-to-network IPv6 communication, and an operation thereof according to a third embodiment of the present invention.

Referring to FIG. 17, an IPv4 network-based IPv6 service providing system according to the third embodiment of the present invention further includes an IPv6 gateway 80. The IPv6 gateway 80 serves to perform IPv4 communication and IPv6 tunneling to an IPv4 network 40, and serves as a gateway of an IPv6 network. Thus, the IPv6 gateway 80 is linked to each terminal on the IPv4 network, thereby enabling communication with terminals on the IPv6 network.

A terminal 10 and the IPv6 gateway 80 subscribe to a portal server 20 for service, and performs a control-tunnel configuration and terminal registration process through message transmission and reception in operations 1301 and 1302, respectively. Here, the terminal 10 and the IPv6 gateway 80 can transmit/receive an IPv6 message through a control tunnel.

In operation 1303, when the terminal 10 receives a terminal addition request from a user group management unit, the terminal 10 performs a process of registering the IPv6 gateway 80 as a counterpart terminal on a counterpart terminal list. Thus, the IPv6 gateway 80 is registered so as to allow the corresponding terminal to access the IPv6 network 3ffe:200::/64. Here, the terminal 10 respectively transmits and receives a terminal information request message and a terminal information response message with the IPv6 gateway 80, so as to confirm that the IPv6 gateway 80 is a gateway node connected to the IPv6 network. The terminal information request message and the terminal information response message each include information about a request terminal type. For example, a general terminal serves as a mobile node, and a node connecting the IPv6 network serves as a gateway. In the case of the gateway, the terminal information request message and the terminal information response message include an address of a network connected to the gateway at the time of message transmission/reception with the terminal.

In operation 1304, when a user group management unit or an application wants communication with the IPv6 network, a terminal protocol unit of the terminal 10 sends a direct tunnel request message to the IPv6 gateway 3ffe::200 80 by using a network address. In operation 1305, the IPv6 gateway 80 configures a direct tunnel with respect to the corresponding terminal 10 and sends a direct tunnel response message to the terminal 10. Here, the direct tunnel response message includes an IPv6 network address 3ffe:200::/64 that the IPv6 gateway connects.

the terminal 10 receives the direct tunnel response message to configure a direct tunnel 3ffe::200 up to the IPv6 gateway 80, and adds information included in the message to IPv6 router information 3ffe:200::/64 in the configured direct tunnel.

Thereafter, the terminal 10 is able to communicate with every IPv6 terminal on the IPv6 network via the IPv6 gateway 80.

As described so far, according to the present invention, an IPv6 tunneling is provided on an IPv4 network base, which is being widely used, to provide an IPv6 service. Thus, the efficient and cheap IPv6 service can be provided by just changing a control server and terminal software, without changing or modifying any other equipment within a network zone.

For IPv6 P2P communication between two terminals, a direct tunnel according to embodiments of the present invention is directly connected between two terminals without going by way of a server, so that data transmission/reception can be very efficiently performed, and a tunnel can be provided even between terminals on various networks.

Although embodiments have been described with reference to a number of illustrative embodiments thereof, it should be understood that numerous other modifications and embodiments can be devised by those skilled in the art that will fall of within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method for configuring a direct tunnel in an Internet Protocol version 4 (IPv4) network-based Internet Protocol version 6 (IPv6) service providing system having at least two terminals, and a control server interworking with the terminals over an IPv4 network, the direct tunnel being configured at a random request terminal for IPv6 communication service with a counterpart terminal, the method comprising:
configuring a control tunnel with the control server and registering the request terminal to the control server;
registering the counterpart terminal and learning a status of the counterpart terminal in real-time;
determining a tunnel type for direct tunnel configuration with the counterpart terminal by using terminal information obtained through the learning;
sending a direct tunnel request message to the counterpart terminal by using terminal information obtained through the learning;
configuring a direct tunnel with the counterpart terminal when a direct tunnel response message is received from the counterpart terminal;
checking whether IPv6 data transmission is available through the configured direct tunnel; and
wherein the determining of the tunnel type for the direct tunnel configuration with the counterpart terminal comprises:
checking whether the request terminal is attached to a network address translator by using terminal information obtained through the learning;
checking whether the counterpart terminal is attached to a network address translator if the request terminal is not attached to the network address translator;
determining that the direct tunnel configuration is made on a public network if the counterpart terminal is attached to the network address translator, and determining the tunnel type as an IPv6-IPv4 type; and
determining that the direct tunnel configuration is made between a public network and a private network if the counterpart terminal is not attached to a network address translator, and determining the tunnel type as an IPv4-UDP-IPv4 type.

2. The method of claim 1, wherein the registering of the counterpart terminal and the learning of the status of the counterpart terminal in real-time comprises:
adding the counterpart terminal to a counterpart terminal list when the counterpart terminal is found;
periodically checking and managing statuses of counterpart terminals existing on the counterpart terminal list; and
reporting a status change of the request terminal to the counterpart terminals on the counterpart terminal list when an abnormal situation occurs.

3. The method of claim 1, wherein the determining the tunnel type for the direct tunnel configuration with the counterpart terminal further comprises:
checking whether the counterpart terminal is attached to a network address translator if the request terminal is attached to the network address translator; and
determining that the direct tunnel configuration is made between a public network and a private network if the counterpart terminal is not attached to the network address translator, and determining the tunnel type as an IPv6-UDP-IPv4 type.

4. The method of claim 1, wherein the determining of the tunnel type for the direct tunnel configuration with the counterpart terminal comprises:
checking whether the request terminal is attached to a network address translator by using terminal information exchanged with the counterpart terminal;
determining whether the counterpart terminal is attached to a network address translator if the request terminal is attached to the network address translator;
comparing a public IPv4 address of the request terminal with a public IPv4 address of the counterpart terminal from the exchanged terminal information if the counterpart terminal is attached to the network address translator; and
determining that the direct tunnel configuration is made between different private networks if the public IPv4 address of the request terminal and the public IPv4 address of the counterpart terminal are identical, and determining the tunnel type as an IPv6-UDP-IPv4 type.

5. The method of claim 4, wherein the determining of the tunnel type for the direct tunnel configuration with the counterpart terminal further comprises determining that the direct tunnel configuration is made on the same private network if the public IPv4 address of the request terminal and the public IPv4 address of the counterpart terminal are not identical, and determining the tunnel type as an IPv6-IPv4 type.

6. The method of claim 1, wherein the configuring of the direct tunnel with the counterpart terminal when the direct tunnel response message is received from the counterpart terminal comprises:
receiving the direct tunnel response message from the counterpart terminal; checking whether the direct tunnel response message is a valid message by using a counterpart terminal list in the request terminal;
determining a network positional relationship with the counterpart terminal according to position information of the request terminal and position information of the counterpart terminal obtained through the direct tunnel response message, if the direct tunnel response message is a valid message; and
configuring the direct tunnel into a tunnel type corresponding to the determined network positional relationship.

7. The method of claim 1, further comprising determining whether a network address translator of a private network acts as a source network address translator if the request terminal or the counterpart terminal is on the private network in configuring the control tunnel.

8. A method for configuring a direct tunnel in an Internet Protocol version 4 (IPv4) network-based Internet Protocol version 6 (IPv6) service providing system having at least two terminals and a control server interworking with the terminals through an IPv4 network, the direct tunnel being configured for IPv6 communication service at a random counterpart terminal receiving a direct tunnel request, the method comprising:

receiving a message for the direct tunnel request from a request terminal; searching terminal information of the request terminal included in the message;

checking whether the direct tunnel can be configured with the request terminal by using the searched terminal information;

determining a network positional relationship with the request terminal by using the searched terminal information if the direct tunnel can be configured;

generating a direct tunnel response message according to the determined network positional relationship, and sending the generated direct tunnel response message to the request terminal;

configuring the direct tunnel according to the determined network positional relationship; and wherein the determining of the network positional relationship by using the searched terminal information comprises:

checking position information of the counterpart terminal and position information of the request terminal included in the searched terminal information, and configuring the direct tunnel into an IPv6-UDP-IPv4 type if the counterpart terminal is on a public network and the request terminal is on a private network; and configuring the direct tunnel into an IPv6-IPv4 type if both the counterpart terminal and the request terminal are on the public network.

9. The method of claim 8, wherein the determining of the network positional relationship by using the searched terminal information comprises:

checking position information of the counterpart terminal and position information of the request terminal included in the searched terminal information, and configuring the direct tunnel into an IPv6-user datagram protocol (UDP)-IPv4 type if the counterpart terminal is on a private network; and configuring the direct tunnel into an IPv6-IPv4 type if the request terminal and the counterpart terminal are on the same private network.

* * * * *